US008896936B2

(12) United States Patent
Tsai et al.

(10) Patent No.: US 8,896,936 B2
(45) Date of Patent: Nov. 25, 2014

(54) IMAGE CAPTURING LENS ASSEMBLY

(71) Applicant: Largan Precision Co., Ltd., Taichung (TW)

(72) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 117 days.

(21) Appl. No.: 13/861,398

(22) Filed: Apr. 12, 2013

(65) Prior Publication Data
US 2014/0300975 A1      Oct. 9, 2014

(30) Foreign Application Priority Data

Apr. 8, 2013   (TW) .............................. 102112356 A

(51) Int. Cl.
*G02B 9/60*        (2006.01)
*G02B 13/18*       (2006.01)
*G02B 13/00*       (2006.01)

(52) U.S. Cl.
CPC .............. *G02B 13/0045* (2013.01); *G02B 9/60* (2013.01)
USPC ............................ 359/714; 359/764; 359/766

(58) Field of Classification Search
CPC ............................... G02B 13/0045; G02B 9/60
USPC .................................. 359/714, 763–767, 708
See application file for complete search history.

(56) References Cited

U.S. PATENT DOCUMENTS

| 4,154,509 | A | * | 5/1979 | Takahashi | ..................... 359/753 |
| 7,869,142 | B2 | | 1/2011 | Chen et al. | |
| 8,189,273 | B2 | | 5/2012 | Noda | |
| 8,649,112 | B2 | * | 2/2014 | Tsai et al. | ..................... 359/714 |
| 2014/0204480 | A1 | | 7/2014 | Jo et al. | |

* cited by examiner

*Primary Examiner* — Zachary Wilkes
(74) *Attorney, Agent, or Firm* — CKC & Partners Co., Ltd.

(57) ABSTRACT

An image capturing lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element has refractive power, wherein both of an object-side surface and an image-side surface thereof are aspheric. The fifth lens element with positive refractive power has a concave object-side surface and a convex image-side surface, wherein both of the object-side surface and the image-side surface thereof are aspheric. Each of the first through fifth lens elements with refractive power is single and non-cemented. The image capturing lens assembly has a total of five lens elements with refractive power.

25 Claims, 14 Drawing Sheets

IMAGE CAPTURING LENS ASSEMBLY

RELATED APPLICATIONS

The application claims priority to Taiwan Application Serial Number 102112356, filed Apr. 8, 2013, which is herein incorporated by reference.

BACKGROUND

1. Technical Field

The present disclosure relates to an image capturing lens assembly. More particularly, the present disclosure relates to a compact image capturing lens assembly applicable to electronic products.

2. Description of Related Art

In recent years, with the popularity of mobile products having camera functionalities, the demand for a miniaturized optical system has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product, as shown in the U.S. Pat. No. 7,869,142, mainly adopts a structure of four lens elements. Due to the popularity of mobile products with high-end specifications, such as smart phones and tablet personal computers, requirements of higher megapixels and better image quality have been increasing rapidly. However, the conventional optical systems cannot satisfy the requirements of high-end optical systems with camera functionalities.

A conventional optical system with five lens elements, such as the one disclosed in the U.S. Pat. No. 8,189,273, is not favorable for effectively controlling the incident angle on the image plane. Therefore, this optical system tends to reduce the brightness or saturation at the periphery of an image and the image quality is thereby poor. In addition, the principal point of this optical system tends to result in a short back focal length and it is not favorable for placing filters or other mechanical components which is thereby limited in applications.

SUMMARY

According to one aspect of the present disclosure, an image capturing lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element has refractive power, wherein both of an object-side surface and an image-side surface of the fourth lens element are aspheric. The fifth lens element with positive refractive power has a concave object-side surface and a convex image-side surface, wherein both of the object-side surface and the image-side surface of the fifth lens element are aspheric. Each of the first through fifth lens elements with refractive power is single and non-cemented. The image capturing lens assembly has a total of five lens elements with refractive power and further includes a stop. When an axial distance between the third lens element and the fourth lens element is T34, an axial distance between the fourth lens element and the fifth lens element is T45, an axial distance between the stop and the image-side surface of the fifth lens element is Sd, an axial distance between the object-side surface of the first lens element and the image-side surface of the fifth lens element is Td, and an axial distance between the image-side surface of the fifth lens element and an image plane is BL, the following relationships are satisfied:

$0 < T45/T34 < 0.8;$ $0.7 < Sd/Td < 1.2;$ and $0.1 < BL/Td < 0.7.$

According to another aspect of the present disclosure, an image capturing lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element has refractive power, wherein both of an object-side surface and an image-side surface of the fourth lens element are aspheric. The fifth lens element with positive refractive power has a concave object-side surface and a convex image-side surface, wherein both of the object-side surface and the image-side surface of the fifth lens element are aspheric. Each of the first through fifth lens elements with refractive power is single and non-cemented. The image capturing lens assembly has a total of five lens elements with refractive power and further includes a stop. At least one inflection point is formed on at least one of the object-side surface and the image-side surface of at least one of the first through fifth lens elements. When an axial distance between the third lens element and the fourth lens element is T34, an axial distance between the fourth lens element and the fifth lens element is T45, an axial distance between the stop and the image-side surface of the fifth lens element is Sd, and an axial distance between the object-side surface of the first lens element and the image-side surface of the fifth lens element is Td, the following relationships are satisfied:

$0 < T45/T34 < 1.2;$ and $0.7 < Sd/Td < 1.2.$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
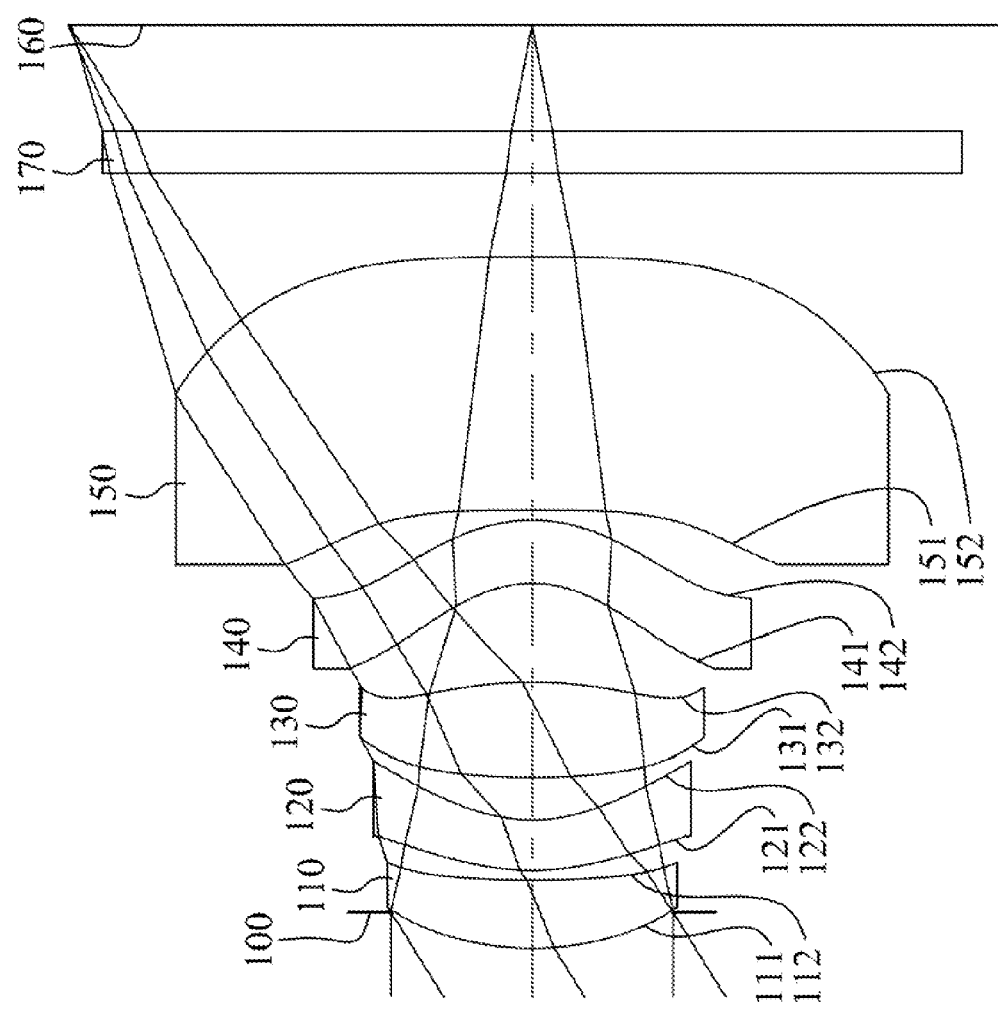
FIG. 1 is a schematic view of an image capturing lens assembly according to the 1st embodiment of the present disclosure.

An image capturing lens assembly includes, in order from an object side to an image side, a first lens element, a second lens element, a third lens element, a fourth lens element and a fifth lens element. Each of the first through fifth lens elements with refractive power is single and non-cemented. The image capturing lens assembly has a total of five lens elements with refractive power. That is, any two lens elements adjacent to each other are not cemented, and there is an air space between the two lens elements. Moreover, the manufacturing process of the cemented lens elements is more complex than the non-cemented lens elements. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the image capturing lens assembly. Therefore, the image capturing lens assembly of the present disclosure provides five non-cemented lens elements for improving the problem generated by the cemented lens elements.

The first lens element with positive refractive power has a convex object-side surface, so that the total track length of the image capturing lens assembly can be reduced by properly adjusting the positive refractive power of the first lens element.

The second lens element with negative refractive power can correct the aberration generated from the first lens element.

The third lens element can have positive refractive power. Therefore, it is favorable for balancing the positive refractive power of the first lens element. Consequently, the excessive spherical aberrations resulted from overloading the positive refractive power on one single lens element can be avoided, and the photosensitivity of the image capturing lens assembly can be reduced.

The fourth lens element can have negative refractive power, a concave object-side surface and a convex image-side surface. Therefore, it is favorable for balancing the distribution of the negative refractive power and correcting the astigmatism and the Petzval sum of the image capturing lens assembly so as to make the image more flat.

The fifth lens element with positive refractive power has a concave object-side surface and a convex image-side surface. Therefore, it is favorable for reducing the incident angle on the image plane, so that the brightness or saturation at the periphery of the image can be maintained, and the principal point can move towards the image plane. It is also favorable for increasing the back focal length of the image capturing lens assembly so as to have enough space for placing optical filters or other mechanical components.

At least one inflection point is formed on at least one of the object-side surface and the image-side surface of at least one of the first through fifth lens elements. Therefore, it is favorable for reducing the incident angle of the off-axis field on the image plane so as to further correct the aberration of the off-axis field.

When an axial distance between the third lens element and the fourth lens element is T34, and an axial distance between the fourth lens element and the fifth lens element is T45, the following relationship is satisfied: $0<T45/T34<1.2$. Therefore, it is favorable for assembling the lens elements and for reducing the total track length of the image capturing lens assembly so as to keep a compact size thereof. Preferably, the following relationship is satisfied: $0<T45/T34<0.8$. More preferably, the following relationship is satisfied: $0.02<T45/T34<0.5$.

The image capturing lens assembly further includes a stop. When an axial distance between the stop and the image-side surface of the fifth lens element is Sd, and an axial distance between the object-side surface of the first lens element and the image-side surface of the fifth lens element is Td, the following relationship is satisfied: $0.7<Sd/Td<1.2$. Therefore, the image capturing lens assembly can have a good balance between the telecentric and wide-angle characteristics so as to maintain a desirable total track length of the image capturing lens assembly.

When an axial distance between the image-side surface of the fifth lens element and the image plane is BL, and the axial distance between the object-side surface of the first lens element and the image-side surface of the fifth lens element is Td, the following relationship is satisfied: $0.1<BL/Td<0.7$. Therefore, the back focal length of the image capturing lens assembly can be adjusted for having enough space to place optical filters or other mechanical components while maintaining a compact size of the image capturing lens assembly.

When a curvature radius of the image-side surface of the fourth lens element is R8, and a curvature radius of the object-side surface of the fifth lens element is R9, the following relationship is satisfied: $|R8/R9|<0.80$. Therefore, it is favorable for correcting the aberration of the image capturing lens assembly so as to improve the image quality.

When a focal length of the image capturing lens assembly is f, and a focal length of the fifth lens element is f5, the following relationship is satisfied: $0<f/f5<0.8$. Therefore, it is favorable for reducing the incident angle on the image plane so as to avoid reducing the brightness or saturation at the periphery of the image.

When a vertical distance between a maximum effective diameter position on the object-side surface of the first lens element and an optical axis is SD11, and a vertical distance between a maximum effective diameter position on the image-side surface of the fifth lens element and the optical axis is SD52, the following relationship is satisfied: $0.2<SD11/SD52<0.6$. Therefore, it is favorable for reducing the incident angle so as to further correct the aberration of the off-axis field.

When a curvature radius of the object-side surface of the fourth lens element is R7, and the focal length of the image capturing lens assembly is f, the following relationship is satisfied: $-0.35<R7/f<0$. Therefore, it is favorable for correcting the aberration of the image capturing lens assembly.

When the focal length of the image capturing lens assembly is f, and a focal length of the fourth lens element is f4, the following relationship is satisfied: $-2.0<f/f4<1.5$. Therefore, it is favorable for correcting the Petzval sum so as to make the image more flat. Preferably, the following relationship is satisfied: $-1.5<f/f4<0.3$.

When a central thickness of the fourth lens element is CT4, and a central thickness of the fifth lens element is CT5, the following relationship is satisfied: $0.1<CT4/CT5<0.5$. Therefore, it is favorable for manufacturing the lens elements so as to increase the manufacturing yield rate.

When an axial distance between the object-side surface of the first lens element and the image plane is TL, and the focal length of the image capturing lens assembly is f, the following relationship is satisfied: $0.7<TL/f<1.4$. Therefore, it is favorable for maintaining a proper total track length of the image capturing lens assembly.

When the focal length of the image capturing lens assembly is f, the curvature radius of the object-side surface of the fifth lens element is R9, and a curvature radius of the image-side surface of the fifth lens element is R10, the following relationship is satisfied: $|f/R9|+|f/R10|<1.5$. Therefore, it is favorable for reducing the incident angle on the image plane so as to avoid reducing the brightness or saturation at the periphery of the image.

When an Abbe number of the second lens element is V2, an Abbe number of the fourth lens element is V4, and an Abbe number of the fifth lens element is V5, the following relationship is satisfied: $0.5<(V2+V4)/V5<1.0$. Therefore, it is favorable for effectively correcting the chromatic aberration of the image capturing lens assembly.

When the focal length of the fourth lens element is f4, and the focal length of the fifth lens element is f5, the following relationship is satisfied: $-0.8<f4/f5<0.8$. Therefore, it is favorable for balancing the distribution of the refractive power of the image capturing lens assembly so as to have enough space for placing optical filters or other mechanical components.

When the curvature radius of the object-side surface of the fourth lens element is R7, and the curvature radius of the image-side surface of the fourth lens element is R8, the following relationship is satisfied: $-0.3<(R7-R8)/(R7+R8)<0$. Therefore, it is favorable for correcting the astigmatism of the image capturing lens assembly.

According to the image capturing lens assembly of the present disclosure, the lens elements can be made of plastic or glass material. When the lens elements are made of plastic material, the manufacturing cost thereof can be decreased. When the lens elements are made of glass material, the distribution of the refractive power of the image capturing lens assembly can be more flexible to design. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the image capturing lens assembly can be effectively reduced.

According to the image capturing lens assembly of the present disclosure, each of an object-side surface and an image-side surface of every lens element has a paraxial region thereof and a peripheral region thereof. The paraxial region thereof refers to the region of the surface where light rays travel close to an optical axis and the peripheral region thereof refers to the region of the surface where light rays travel away from the optical axis. Particularly, when the lens element has a convex surface, it indicates that the surface is convex at the paraxial region thereof; and when the lens element has a concave surface, it indicates that the surface is concave at the paraxial region thereof.

According to the image capturing lens assembly of the present disclosure, the image capturing lens assembly can include at least one stop, such as an aperture stop, a glare stop or a field stop. Said glare stop or said field stop is for eliminating the stray light and thereby improving the image resolution thereof.

According to the image capturing lens assembly of the present disclosure, an aperture stop can be configured as a front stop or a middle stop. A front stop disposed between an imaged object and a first lens element can provide a longer distance between an exit pupil of the system and an image plane and which improves the image-sensing efficiency of the image sensor. A middle stop disposed between the first lens element and an image plane is favorable for enlarging the field of view of the system and thereby provides a wider field of view for the same.

According to the image capturing lens assembly of the present disclosure, the image capturing lens assembly is featured with good correction ability and high image quality, and can be applied to 3D (three-dimensional) image capturing applications, in products such as digital cameras, mobile devices and tablets.

According to the above description of the present disclosure, the following 1st-7th specific embodiments are provided for further explanation.

1st Embodiment

Figure 2:
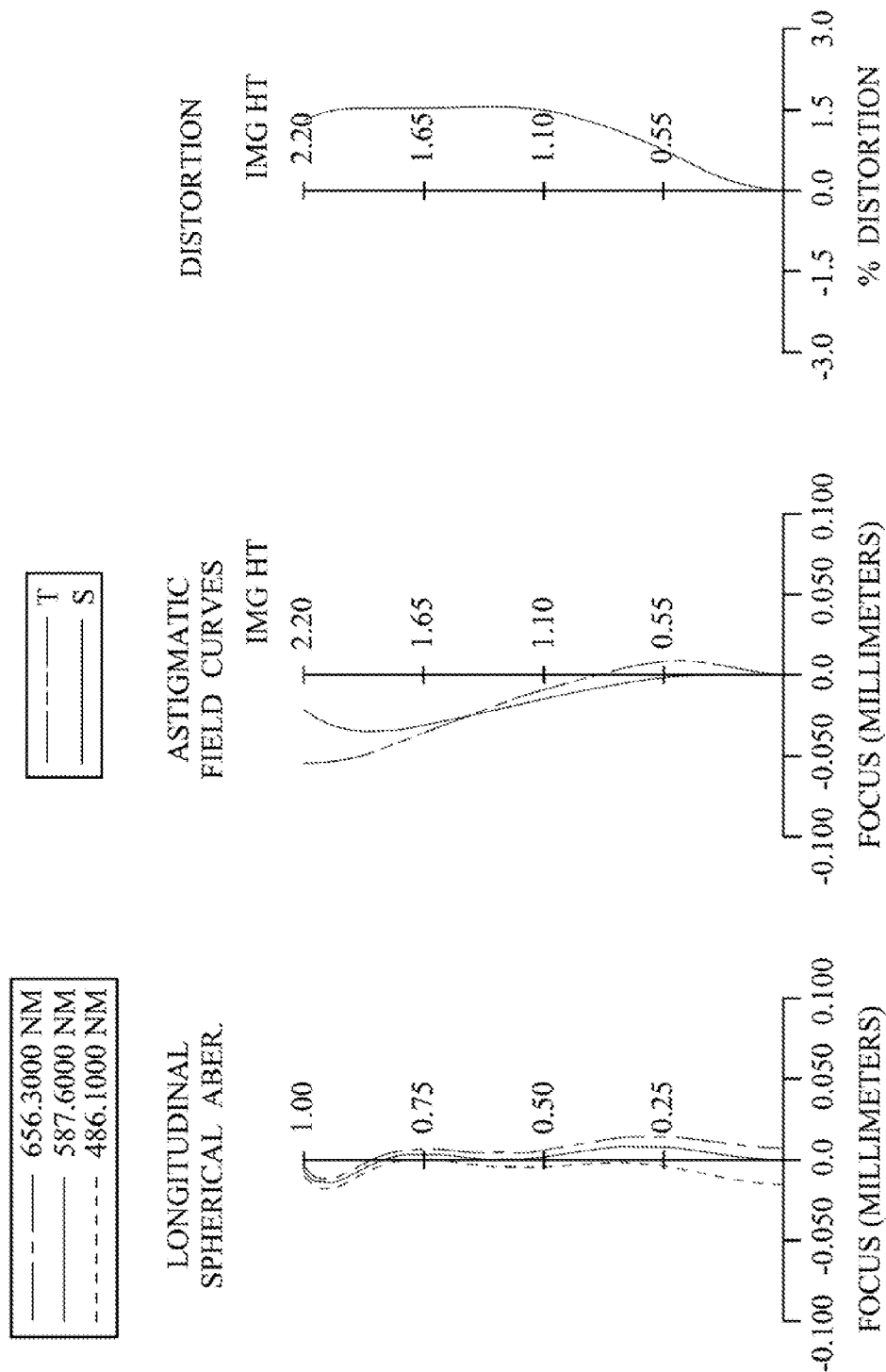
FIG. 2 shows spherical aberration curves, astigmatic field curves and a distortion curve of the image capturing lens assembly according to the 1st embodiment.

FIG. 1 is a schematic view of an image capturing lens assembly according to the 1st embodiment of the present disclosure. FIG. 2 shows spherical aberration curves, astigmatic field curves and a distortion curve of the image capturing lens assembly according to the 1st embodiment. In FIG. 1, the image capturing lens assembly includes, in order from an object side to an image side, an aperture stop 100, a first lens element 110, a second lens element 120, a third lens element 130, a fourth lens element 140, a fifth lens element 150, an IR-cut filter 170 and an image plane 160, wherein the image capturing lens assembly has a total of five lens elements (110-150) with refractive power.

The first lens element 110 with positive refractive power has a convex object-side surface 111 and a concave image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric. Furthermore, both of the object-side surface 121 and the image-side surface 122 of the second lens element 120 have at least one inflection point.

The third lens element 130 with positive refractive power has a convex object-side surface 131 and a convex image-side surface 132, and is made of plastic material. The object-side surface 131 and the image-side surface 132 of the third lens element 130 are aspheric. Furthermore, the image-side surface 132 of the third lens element 130 has at least one inflection point.

The fourth lens element 140 with negative refractive power has a concave object-side surface 141 and a convex image-side surface 142, and is made of plastic material. The object-side surface 141 and the image-side surface 142 of the fourth lens element 140 are aspheric. Furthermore, both of the object-side surface 141 and the image-side surface 142 of the fourth lens element 140 have at least one inflection point.

The fifth lens element 150 with positive refractive power has a concave object-side surface 151 and a convex image-side surface 152, and is made of plastic material. The object-side surface 151 and the mage-side surface 152 of the fifth lens element 150 are aspheric. Furthermore, the object-side surface 151 of the fifth lens element 150 has at least one inflection point.

Each of the first through fifth lens elements (110-150) is a single and non-cemented lens element with refractive power. The IR-cut filter 170 is made of glass and located between the fifth lens element 150 and the image plane 160 and will not affect the focal length of the image capturing lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_j (Ai)\times(Y^i),$$

wherein,

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the image capturing lens assembly according to the 1st embodiment, when a focal length of the image capturing lens assembly is f, an f-number of the image capturing lens assembly is Fno, and half of the maximal field of view of the image capturing lens assembly is HFOV, these parameters have the following values: f=3.48 mm; Fno=2.60; and HFOV=32.0 degrees.

In the image capturing lens assembly according to the 1st embodiment, when an Abbe number of the second lens element 120 is V2, an Abbe number of the fourth lens element 140 is V4, and an Abbe number of the fifth lens element 150 is V5, the following relationship is satisfied: (V2+V4)/V5=0.83.

In the image capturing lens assembly according to the 1st embodiment, when a central thickness of the fourth lens element 140 is CT4, and a central thickness of the fifth lens element 150 is CT5, the following relationship is satisfied: CT4/CT5=0.25.

In the image capturing lens assembly according to the 1st embodiment, when an axial distance between the third lens element 130 and the fourth lens element 140 is T34, and an axial distance between the fourth lens element 140 and the fifth lens element 150 is T45, the following relationship is satisfied: T45/T34=0.10.

In the image capturing lens assembly according to the 1st embodiment, when the focal length of the image capturing lens assembly is f, a curvature radius of the object-side surface 141 of the fourth lens element 140 is R7, a curvature radius of the image-side surface 142 of the fourth lens element 140 is R8, a curvature radius of the object-side surface 151 of the fifth lens element 150 is R9, and a curvature radius of the image-side surface 152 of the fifth lens element 150 is R10, the following relationships are satisfied: R7/f=−0.16; (R7−R8)/(R7+R8)=−0.16; |R8/R9|=0.02; and |f/R9|+|f/R10|=0.21.

In the image capturing lens assembly according to the 1st embodiment, when the focal length of the image capturing lens assembly is f, a focal length of the fourth lens element 140 is f4, and a focal length of the fifth lens element 150 is f5, the following relationships are satisfied: f/f4=−0.51; f/f5=0.03; and f4/f5=−0.06.

In the image capturing lens assembly according to the 1st embodiment, when a vertical distance between a maximum effective diameter position on the object-side surface 111 of the first lens element 110 and an optical axis is SD11 and a vertical distance between a maximum effective diameter position on the image-side surface 152 of the fifth lens element 150 and the optical axis is SD52, the following relationship is satisfied: SD11/SD52=0.40.

In the image capturing lens assembly according to the 1st embodiment, when an axial distance between the aperture stop 100 and the image-side surface 152 of the fifth lens element 150 is Sd, an axial distance between the object-side surface 111 of the first lens element 110 and the image-side surface 152 of the fifth lens element 150 is Td, and an axial distance between the image-side surface 152 of the fifth lens element 150 and the image plane 160 is BL, the following relationships are satisfied: Sd/Td=0.95; and BL/Td=0.34.

In the image capturing lens assembly according to the 1st embodiment, when an axial distance between the object-side surface 111 of the first lens element 110 and the image plane 160 is TL, and the focal length of the image capturing lens assembly is f, the following relationship is satisfied: TL/f=1.26.

The detailed optical data of the 1st embodiment are shown in Table 1 and the aspheric surface data are shown in Table 2 below.

TABLE 1

1st Embodiment
f = 3.48 mm, Fno = 2.60, HFOV = 32.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.169 | | | | |
| 2 | Lens 1 | 1.484 | ASP | 0.325 | Plastic | 1.544 | 55.9 | 3.79 |
| 3 | | 4.881 | ASP | 0.045 | | | | |
| 4 | Lens 2 | 1.128 | ASP | 0.240 | Plastic | 1.640 | 23.3 | −5.39 |
| 5 | | 0.780 | ASP | 0.202 | | | | |

TABLE 1-continued

1st Embodiment
f = 3.48 mm, Fno = 2.60, HFOV = 32.0 deg.

| Surface # | | Curvature Radius | | Thickness | Material | Index | Abbe # | Focal Length |
|---|---|---|---|---|---|---|---|---|
| 6 | Lens 3 | 3.715 | ASP | 0.451 | Plastic | 1.544 | 55.9 | 2.47 |
| 7 | | −2.021 | ASP | 0.469 | | | | |
| 8 | Lens 4 | −0.543 | ASP | 0.300 | Plastic | 1.640 | 23.3 | −6.76 |
| 9 | | −0.755 | ASP | 0.045 | | | | |
| 10 | Lens 5 | −44.843 | ASP | 1.200 | Plastic | 1.544 | 55.9 | 116.05 |
| 11 | | −26.470 | ASP | 0.400 | | | | |
| 12 | IR-cut filter | Plano | | 0.200 | Glass | 1.517 | 64.2 | — |
| 13 | | Plano | | 0.504 | | | | |
| 14 | Image | Plano | | — | | | | |

Note:
Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | 3.8950E−01 | 3.0000E+00 | −6.1252E+00 | −2.2723E+00 | 2.3914E+00 |
| A4 = | 7.3378E−02 | −8.3233E−02 | −1.2071E−01 | −1.4828E−01 | 5.0249E−02 |
| A6 = | −5.2010E−02 | 7.0677E−01 | 3.5715E−01 | 4.5946E−01 | 2.0732E−01 |
| A8 = | 1.0676E−01 | −5.3573E−01 | −2.7964E−01 | −5.0737E−01 | 2.8825E−01 |
| A10 = | 3.2431E−01 | 1.3366E−01 | −5.3097E−02 | 8.1618E−02 | −2.3264E−01 |
| A12 = | −1.6823E−01 | 9.7502E−02 | −1.0128E−01 | −1.0363E−01 | −4.2622E−01 |
| A14 = | −1.7516E−01 | 2.9087E−01 | −2.1514E−02 | −8.5942E−02 | 4.3739E−01 |
| A16 = | | | | | −6.3428E−02 |

| | Surface # | | | | |
|---|---|---|---|---|---|
| | 7 | 8 | 9 | 10 | 11 |
| k = | −5.8637E+00 | −1.3148E+00 | −8.7876E−01 | −1.0000E+00 | −1.0000E+00 |
| A4 = | −4.5442E−02 | 2.5889E−01 | 2.2108E−01 | −2.2825E−01 | −8.1130E−02 |
| A6 = | 2.3239E−01 | 1.0676E−01 | 3.4022E−02 | 2.9676E−02 | 9.6233E−03 |
| A8 = | 2.4470E−01 | 2.5501E−01 | 1.5013E−01 | −2.3898E−03 | −5.2822E−03 |
| A10 = | 4.6846E−04 | −3.3582E−01 | 4.7181E−02 | 2.0121E−02 | 2.3021E−03 |
| A12 = | 3.1227E−01 | −2.0706E−02 | −8.8196E−02 | 1.5141E−02 | −4.8306E−04 |
| A14 = | −3.2321E−02 | −3.6097E−02 | −7.1102E−02 | 2.6847E−03 | 1.1943E−05 |
| A16 = | | 4.6733E−03 | 3.8662E−02 | −8.2005E−03 | |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
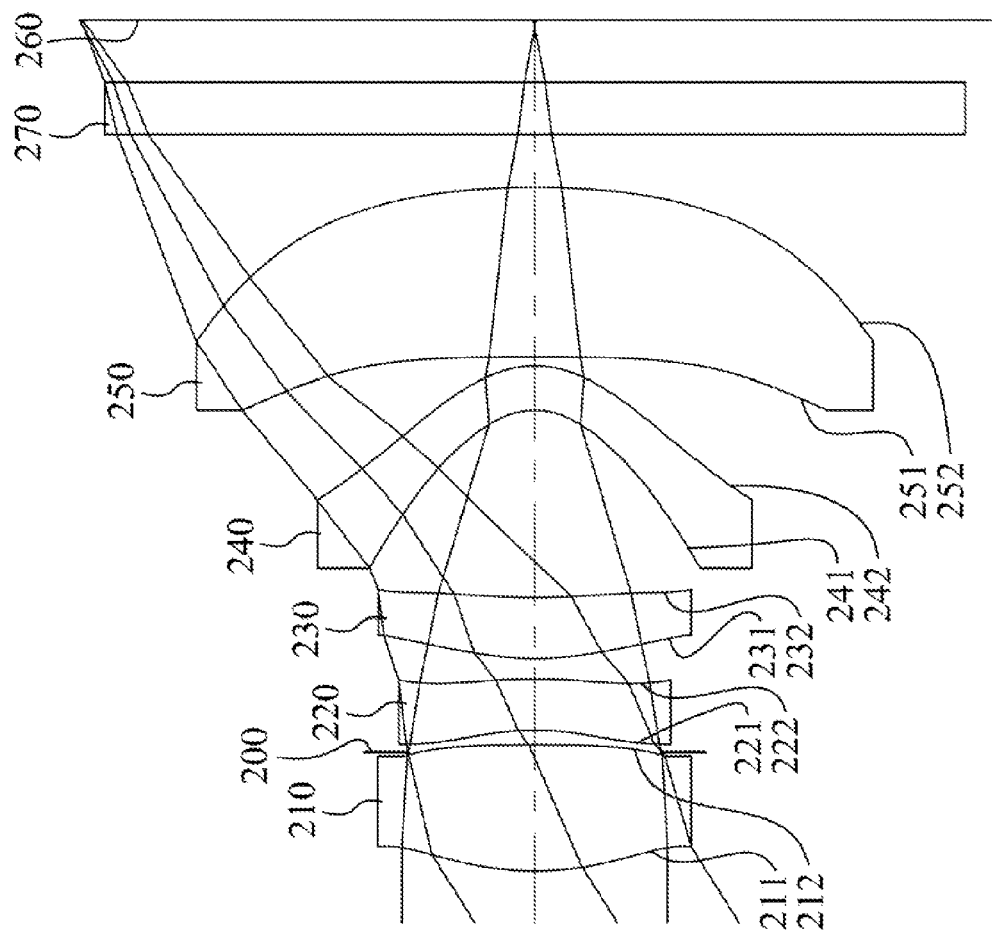
FIG. 3 is a schematic view of an image capturing lens assembly according to the 2nd embodiment of the present disclosure.
Figure 4:
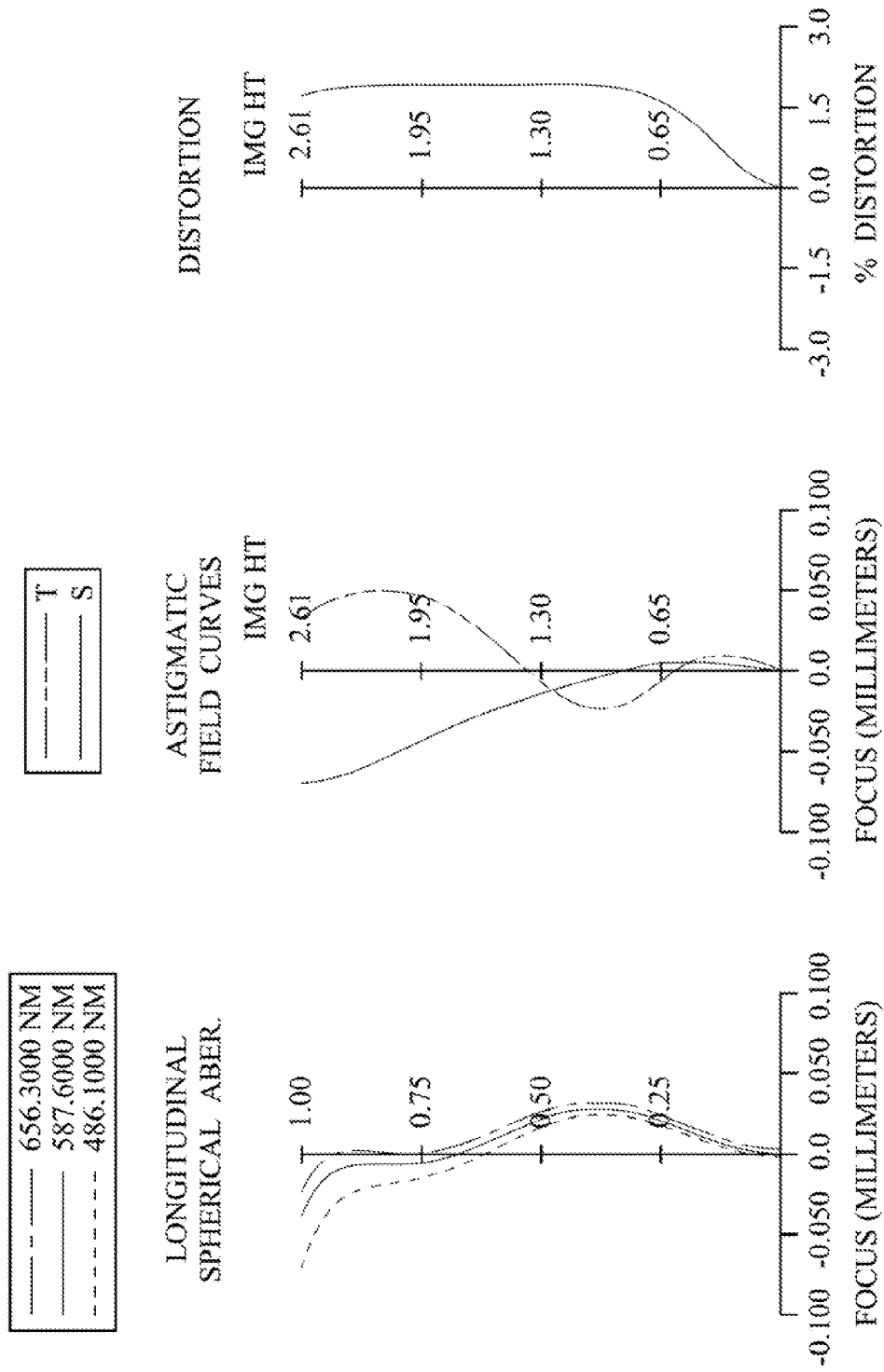
FIG. 4 shows spherical aberration curves, astigmatic field curves and a distortion curve of the image capturing lens assembly according to the 2nd embodiment.

FIG. 3 is a schematic view of an image capturing lens assembly according to the 2nd embodiment of the present disclosure. FIG. 4 shows spherical aberration curves, astigmatic field curves and a distortion curve of the image capturing lens assembly according to the 2nd embodiment. In FIG. 3, the image capturing lens assembly includes, in order from an object side to an image side, a first lens element 210, an aperture stop 200, a second lens element 220, a third lens element 230, a fourth lens element 240, a fifth lens element 250, an IR-cut filter 270 and an image plane 260, wherein the image capturing lens assembly has a total of five lens elements (210-250) with refractive power.

The first lens element 210 with positive refractive power has a convex object-side surface 211 and a convex image-side surface 212, and is made of plastic material. The object-side surface 211 and the image-side surface 212 of the first lens element 210 are aspheric. Furthermore, the object-side surface 211 of the first lens element 210 has at least one inflection point.

The second lens element 220 with negative refractive power has a concave object-side surface 221 and a convex image-side surface 222, and is made of plastic material. The object-side surface 221 and the image-side surface 222 of the second lens element 220 are aspheric. Furthermore, both of the object-side surface 221 and the image-side surface 222 of the second lens element 220 have at least one inflection point.

The third lens element 230 with positive refractive power has a convex object-side surface 231 and a concave image-side surface 232, and is made of plastic material. The object-side surface 231 and the image-side surface 232 of the third lens element 230 are aspheric. Furthermore, both of the object-side surface 231 and the image-side surface 232 of the third lens element 230 have at least one inflection point.

The fourth lens element 240 with negative refractive power has a concave object-side surface 241 and a convex image-side surface 242, and is made of plastic material. The object-side surface 241 and the image-side surface 242 of the fourth lens element 240 are aspheric. Furthermore, the image-side surface 242 of the fourth lens element 240 has at least one inflection point.

The fifth lens element 250 with positive refractive power has a concave object-side surface 251 and a convex image-side surface 252, and is made of plastic material. The object-side surface 251 and the image-side surface 252 of the fifth lens element 250 are aspheric. Furthermore, the object-side surface 251 of the fifth lens element 250 has at least one inflection point.

Each of the first through fifth lens elements (210-250) is a single and non-cemented lens element with refractive power. The IR-cut filter 270 is made of glass and located between the fifth lens element 250 and the image plane 260, and will not affect the focal length of the image capturing lens assembly.

The detailed optical data of the 2nd embodiment are shown in Table 3 and the aspheric surface data are shown in Table 4 below.

TABLE 3

2nd Embodiment
f = 4.10 mm, Fno = 2.70, HFOV = 31.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.698 | ASP | 0.721 | Plastic | 1.544 | 55.9 | 2.85 |
| 2 | | −14.913 | ASP | −0.043 | | | | |
| 3 | Ape. Stop | Plano | | 0.123 | | | | |
| 4 | Lens 2 | −1.521 | ASP | 0.295 | Plastic | 1.634 | 23.8 | −4.52 |
| 5 | | −3.483 | ASP | 0.117 | | | | |
| 6 | Lens 3 | 1.543 | ASP | 0.347 | Plastic | 1.544 | 55.9 | 4.37 |
| 7 | | 4.050 | ASP | 1.073 | | | | |
| 8 | Lens 4 | −0.412 | ASP | 0.251 | Plastic | 1.634 | 23.8 | −5.00 |
| 9 | | −0.585 | ASP | 0.050 | | | | |
| 10 | Lens 5 | −66.667 | ASP | 0.974 | Plastic | 1.544 | 55.9 | 9.07 |
| 11 | | −4.620 | ASP | 0.300 | | | | |
| 12 | IR-cut filter | Plano | | 0.300 | Glass | 1.517 | 64.2 | — |
| 13 | | Plano | | 0.356 | | | | |
| 14 | Image | Plano | | — | | | | |

Note:
Reference wavelength (d-line) is 587.6 nm.

TABLE 4

Aspheric Coefficients

| | Surface # | | | | |
|---|---|---|---|---|---|
| | 1 | 2 | 4 | 5 | 6 |
| k = | −6.9679E−01 | 0.0000E+00 | −8.7459E+00 | −1.1698E+01 | −1.2478E+01 |
| A4 = | −5.2061E−02 | −1.1815E−01 | 1.7669E−01 | 1.0864E−01 | −5.0217E−02 |
| A6 = | −4.8844E−02 | −7.2590E−02 | 6.8510E−02 | 3.3808E−01 | −2.3626E−02 |
| A8 = | −8.8336E−02 | 2.9015E−02 | −8.6056E−02 | −3.3557E−01 | 2.4444E−02 |
| A10 = | −8.2369E−02 | 1.2138E−02 | −8.8545E−03 | −1.4004E−03 | 1.0214E−01 |
| A12 = | 7.0158E−02 | −1.0241E−02 | 6.0732E−02 | 5.7163E−02 | −5.3418E−02 |
| A14 = | | | | | 1.1652E−02 |
| A16 = | | | | | −4.9166E−02 |

| | Surface # | | | | |
|---|---|---|---|---|---|
| | 7 | 8 | 9 | 10 | 11 |
| k = | −2.9198E+01 | −1.1045E+00 | −1.1803E+00 | 0.0000E+00 | 4.7491E−01 |
| A4 = | −1.0351E−01 | 2.3654E−01 | 1.7103E−01 | −6.4772E−02 | −2.5729E−02 |
| A6 = | −2.1252E−02 | −1.3930E−01 | 5.9139E−03 | 1.1928E−02 | −2.8780E−03 |
| A8 = | 4.3833E−02 | −1.1795E−01 | −4.8844E−03 | −1.1672E−03 | 3.2334E−04 |
| A10 = | 1.6272E−02 | 3.3721E−02 | −6.8777E−03 | 2.4407E−04 | 1.5446E−04 |
| A12 = | 8.7109E−02 | 5.6315E−02 | 1.0131E−03 | −1.1024E−05 | −8.8322E−05 |
| A14 = | | | | | 1.2148E−05 |

In the image capturing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| 2nd Embodiment | | | |
|---|---|---|---|
| f [mm] | 4.10 | \|f/R9\| + \|f/R10\| | 0.95 |
| Fno | 2.70 | f/f4 | −0.82 |
| HFOV [deg.] | 31.9 | f/f5 | 0.45 |
| (V2 + V4)/V5 | 0.85 | f4/f5 | −0.55 |
| CT4/CT5 | 0.26 | SD11/SD52 | 0.47 |
| T45/T34 | 0.05 | Sd/Td | 0.83 |
| R7/f | −0.10 | BL/Td | 0.24 |
| (R7 − R8)/(R7 + R8) | −0.17 | TL/f | 1.19 |
| \|R8/R9\| | 0.01 | | |

3rd Embodiment

Figure 5:
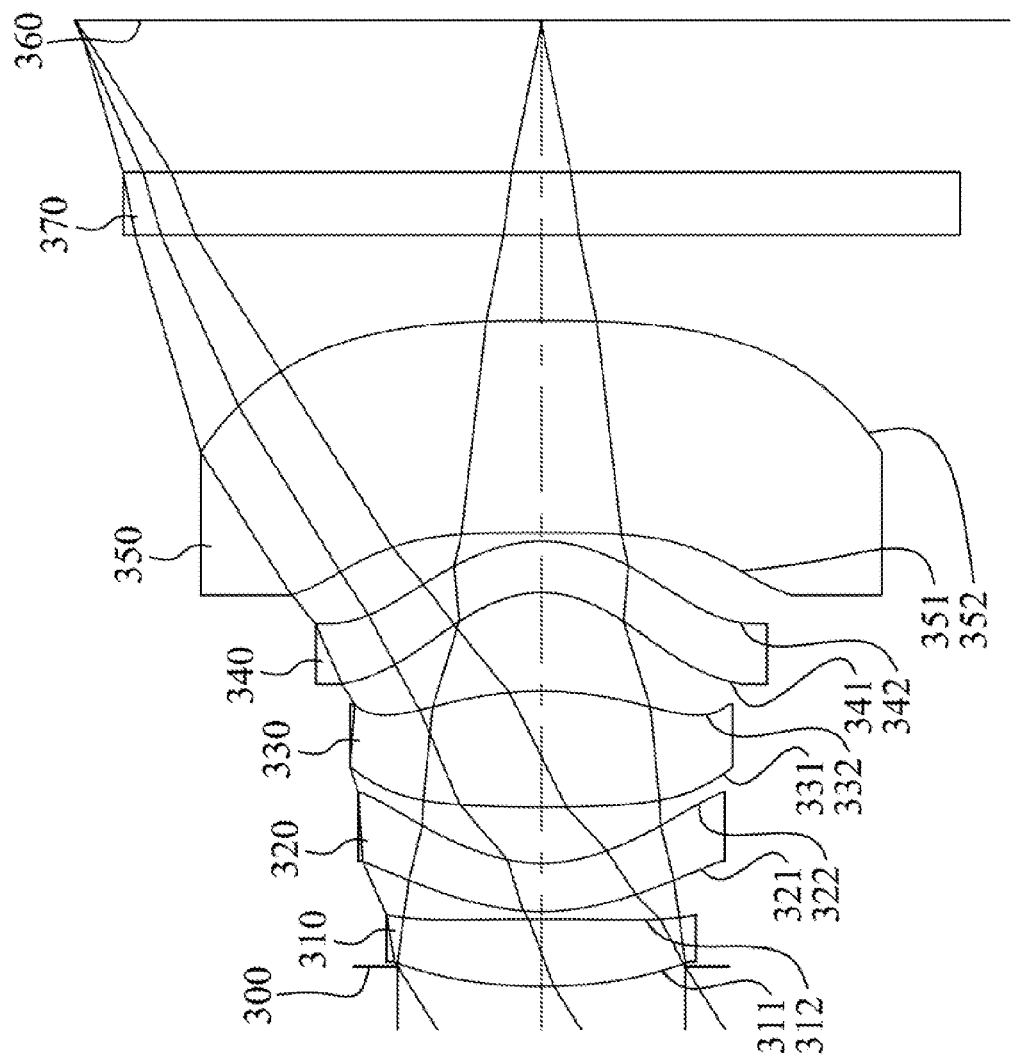
FIG. 5 is a schematic view of an image capturing lens assembly according to the 3rd embodiment of the present disclosure.
Figure 6:
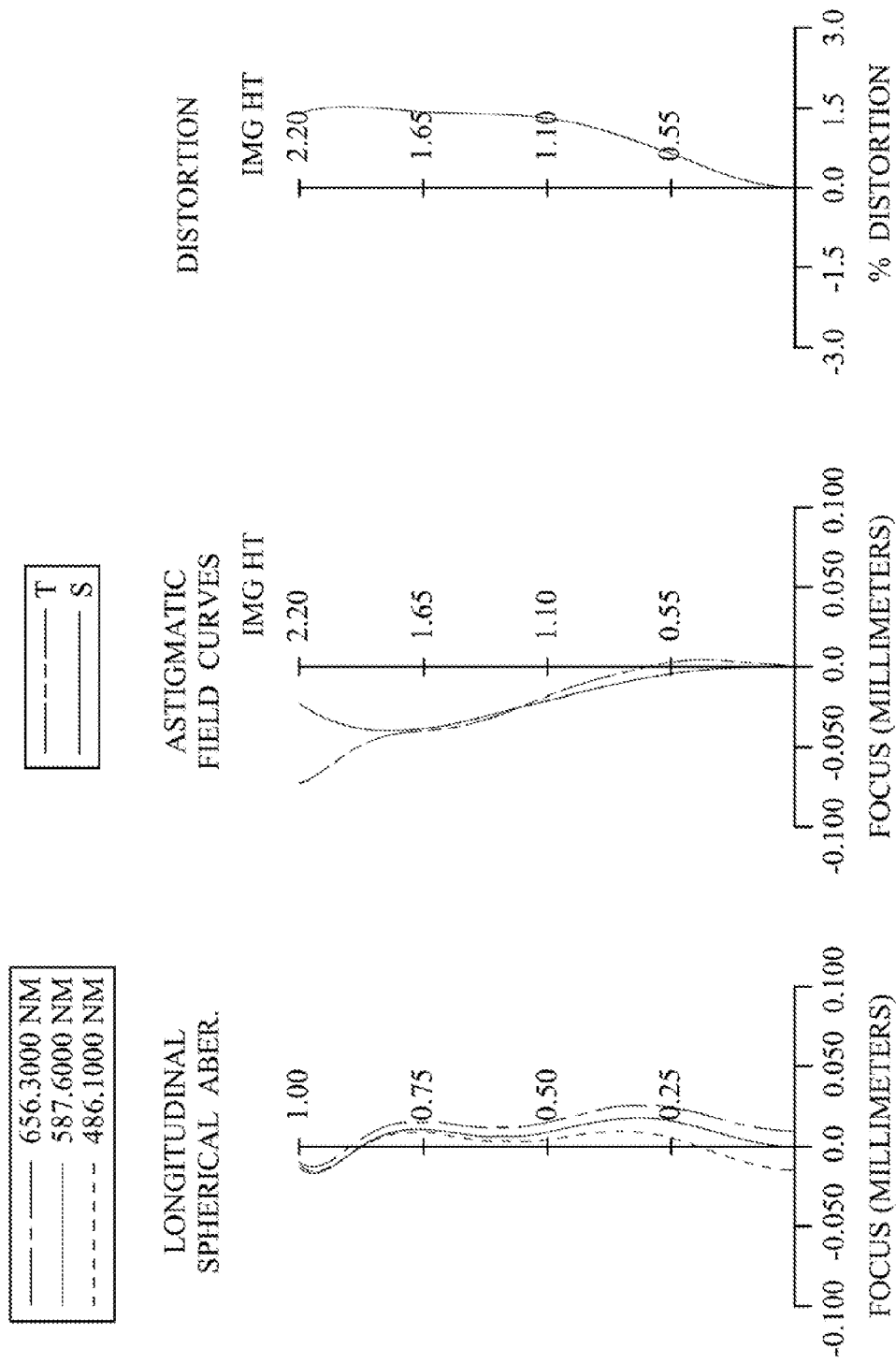
FIG. 6 shows spherical aberration curves, astigmatic field curves and a distortion curve of the image capturing lens assembly according to the 3rd embodiment.

FIG. 5 is a schematic view of an image capturing lens assembly according to the 3rd embodiment of the present disclosure. FIG. 6 shows spherical aberration curves, astigmatic field curves and a distortion curve of the image capturing lens assembly according to the 3rd embodiment. In FIG. 5, the image capturing lens assembly includes, in order from an object side to an image side, an aperture stop 300, a first lens element 310, a second lens element 320, a third lens element 330, a fourth lens element 340, a fifth lens element 350, an IR-cut filter 370 and an image plane 360, wherein the image capturing lens assembly has a total of five lens elements (310-350) with refractive power.

The first lens element 310 with positive refractive power has a convex object-side surface 311 and a convex image-side surface 312, and is made of plastic material. The object-side surface 311 and the image-side surface 312 of the first lens element 310 are aspheric. Furthermore, the image-side surface 312 of the first lens element 310 has at least one inflection point.

The second lens element 320 with negative refractive power has a convex object-side surface 321 and a concave image-side surface 322, and is made of plastic material. The object-side surface 321 and the image-side surface 322 of the second lens element 320 are aspheric. Furthermore, both of the object-side surface 321 and the image-side surface 322 of the second lens element 320 have at least one inflection point.

The third lens element 330 with positive refractive power has a convex object-side surface 331 and a convex image-side surface 332, and is made of plastic material. The object-side surface 331 and the image-side surface 332 of the third lens element 330 are aspheric. Furthermore, the image-side surface 332 of the third lens element 330 has at least one inflection point.

The fourth lens element 340 with negative refractive power has a concave object-side surface 341 and a convex image-side surface 342, and is made of plastic material. The object-side surface 341 and the image-side surface 342 of the fourth lens element 340 are aspheric. Furthermore, both of the object-side surface 341 and the image-side surface 342 of the fourth lens element 340 have at least one inflection point.

The fifth lens element 350 with positive refractive power has a concave object-side surface 351 and a convex image-side surface 352, and is made of plastic material. The object-side surface 351 and the image-side surface 352 of the fifth lens element 350 are aspheric. Furthermore, the object-side surface 351 of the fifth lens element 350 has at least one inflection point.

Each of the first through fifth lens elements (310-350) is a single and non-cemented lens element with refractive power. The IR-cut filter 370 is made of glass and located between the fifth lens element 350 and the image plane 360, and will not affect the focal length of the image capturing lens assembly.

The detailed optical data of the 3rd embodiment are shown in Table 5 and the aspheric surface data are shown in Table 6 below.

TABLE 5

3rd Embodiment
f = 3.46 mm, Fno = 2.55, HFOV = 32.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.094 | | | | |
| 2 | Lens 1 | 2.416 | ASP | 0.315 | Plastic | 1.544 | 55.9 | 3.97 |
| 3 | | −19.461 | ASP | 0.035 | | | | |
| 4 | Lens 2 | 1.011 | ASP | 0.230 | Plastic | 1.650 | 21.4 | −6.41 |
| 5 | | 0.741 | ASP | 0.266 | | | | |
| 6 | Lens 3 | 7.555 | ASP | 0.546 | Plastic | 1.544 | 55.9 | 2.57 |
| 7 | | −1.676 | ASP | 0.463 | | | | |
| 8 | Lens 4 | −0.496 | ASP | 0.244 | Plastic | 1.650 | 21.4 | −5.97 |
| 9 | | −0.678 | ASP | 0.040 | | | | |
| 10 | Lens 5 | −28.507 | ASP | 0.999 | Plastic | 1.544 | 55.9 | 25.63 |
| 11 | | −9.481 | ASP | 0.400 | | | | |
| 12 | IR-cut filter | Plano | | 0.300 | Glass | 1.517 | 64.2 | — |
| 13 | | Plano | | 0.717 | | | | |
| 14 | Image | Plano | | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | 3.5559E−01 | −1.0000E+00 | −5.0087E+00 | −2.2470E+00 | −2.4559E+01 |
| A4 = | 7.9466E−02 | −2.8221E−02 | −4.0909E−02 | −1.5696E−01 | 4.2620E−02 |
| A6 = | −1.4244E−01 | 4.7463E−01 | 3.0057E−01 | 4.6971E−01 | 1.9152E−01 |
| A8 = | 1.6037E−01 | −5.2398E−01 | −5.2056E−01 | −5.3883E−01 | 2.7905E−01 |
| A10 = | 2.1607E−01 | 1.3416E−01 | 2.2677E−01 | 6.4827E−02 | −1.4986E−01 |
| A12 = | −1.6789E−01 | 9.8730E−02 | 6.9615E−02 | 1.0186E−02 | −4.6914E−01 |
| A14 = | −1.7015E−01 | 2.9248E−01 | −2.7147E−02 | −6.3576E−03 | 3.6178E−01 |
| A16 = | | | | | −5.8819E−02 |

| Surface # | 7 | 8 | 9 | 10 | 11 |
|---|---|---|---|---|---|
| k = | −3.0212E+00 | −1.3125E+00 | −9.3659E−01 | −1.0000E+00 | −1.0000E+00 |
| A4 = | −6.7274E−02 | 2.9261E−01 | 2.5429E−01 | −2.6709E−01 | −7.5666E−02 |
| A6 = | 2.2599E−01 | 1.5645E−01 | 3.9158E−02 | 3.6856E−02 | 3.1050E−03 |
| A8 = | 1.9974E−01 | 2.3639E−01 | 1.4869E−01 | 1.4037E−03 | −2.6002E−03 |
| A10 = | −1.1032E−01 | −3.7922E−01 | 4.7415E−02 | 2.0465E−02 | 2.4483E−03 |
| A12 = | 1.8019E−01 | −3.7430E−02 | −8.9398E−02 | 1.5854E−02 | −6.7703E−04 |
| A14 = | −8.6742E−03 | 6.1662E−02 | −7.0843E−02 | 3.7362E−03 | −2.0087E−06 |
| A16 = | | 2.8970E−02 | 4.3985E−02 | −8.5513E−03 | |

In the image capturing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| 3rd Embodiment | | | |
|---|---|---|---|
| f [mm] | 3.46 | |f/R9| + |f/R10| | 0.49 |
| Fno | 2.55 | f/f4 | −0.58 |
| HFOV [deg.] | 32.1 | f/f5 | 0.13 |
| (V2 + V4)/V5 | 0.77 | f4/f5 | −0.23 |
| CT4/CT5 | 0.24 | SD11/SD52 | 0.43 |
| T45/T34 | 0.09 | Sd/Td | 0.97 |
| R7/f | −0.14 | BL/Td | 0.45 |
| (R7 − R8)/(R7 + R8) | −0.16 | TL/f | 1.32 |
| |R8/R9| | 0.02 | | |

4th Embodiment

Figure 7:
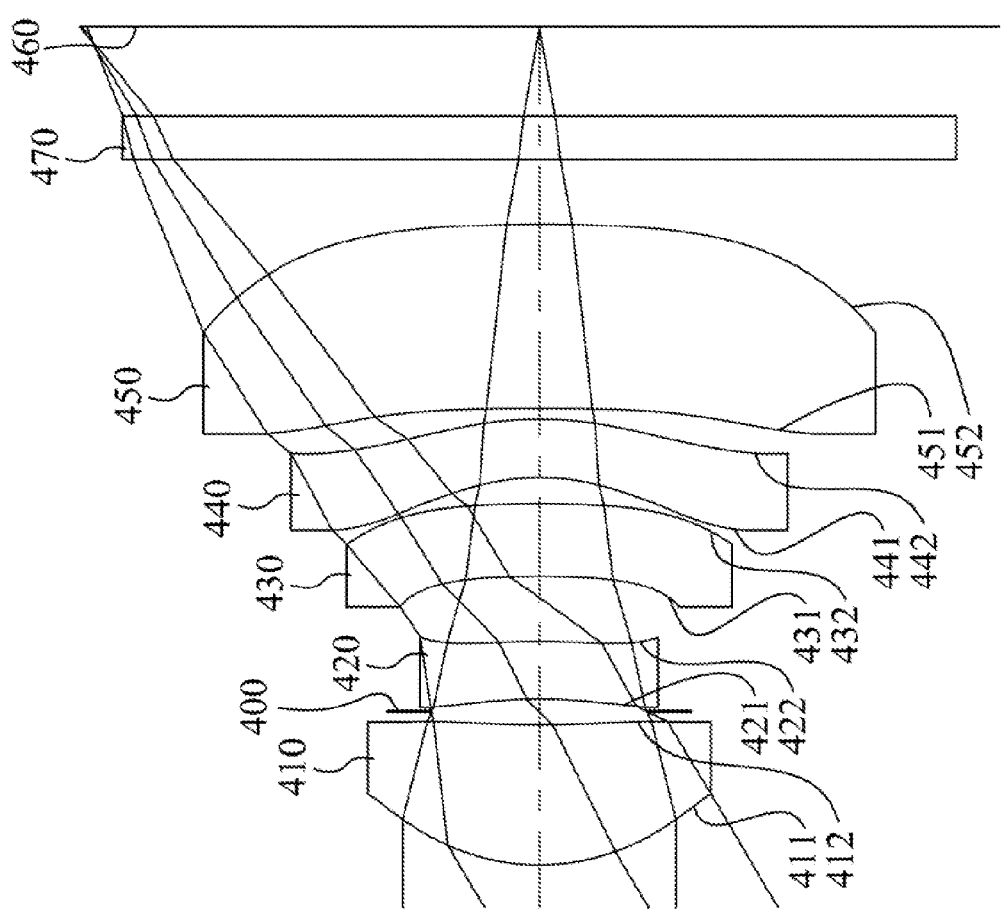
FIG. 7 is a schematic view of an image capturing lens assembly according to the 4th embodiment of the present disclosure.
Figure 8:
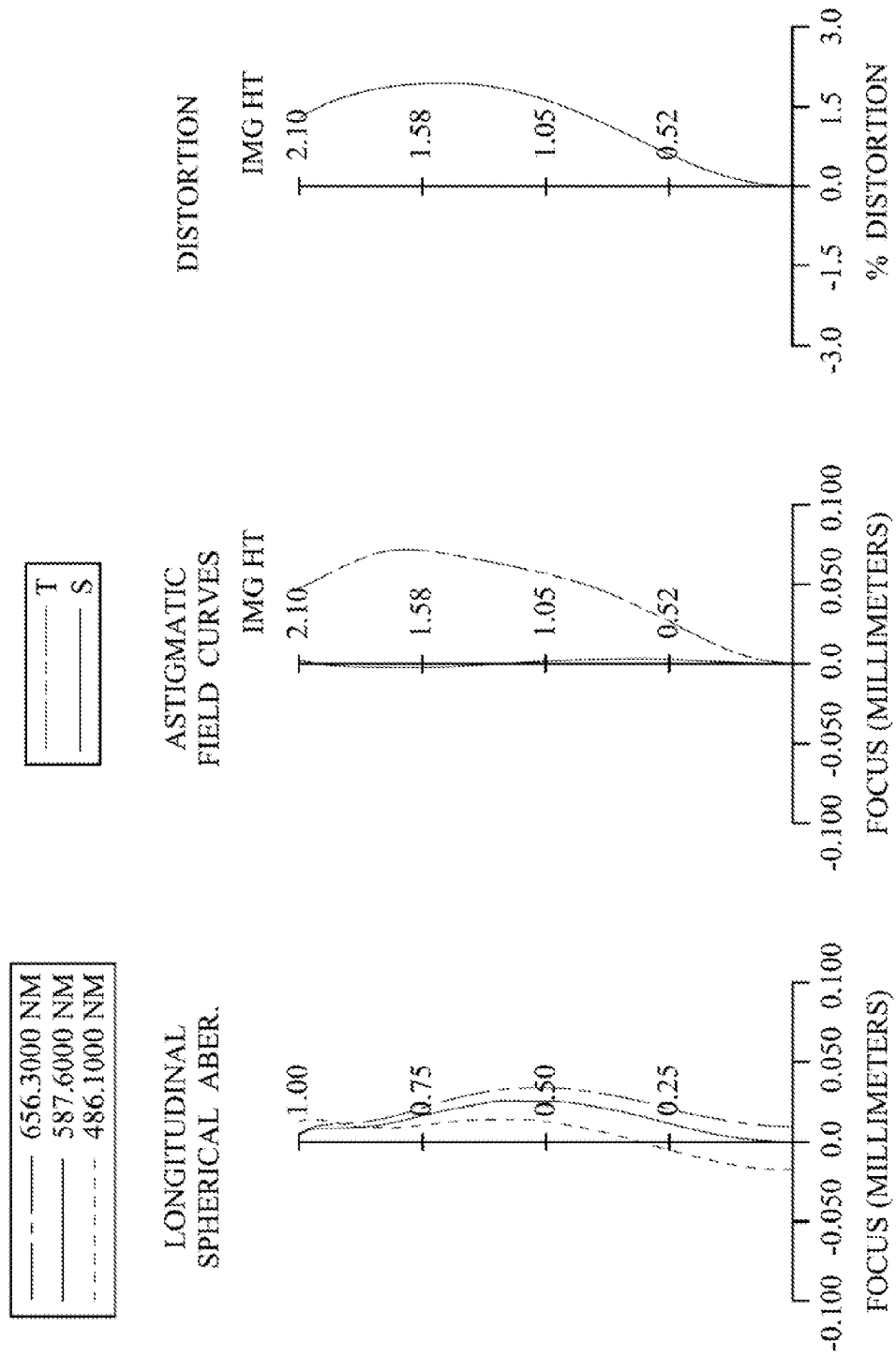
FIG. 8 shows spherical aberration curves, astigmatic field curves and a distortion curve of the image capturing lens assembly according to the 4th embodiment.

FIG. 7 is a schematic view of an image capturing lens assembly according to the 4th embodiment of the present disclosure. FIG. 8 shows spherical aberration curves, astigmatic field curves and a distortion curve of the image capturing lens assembly according to the 4th embodiment. In FIG. 7, the image capturing lens assembly includes, in order from an object side to an image side, a first lens element 410, an aperture stop 400, a second lens element 420, a third lens element 430, a fourth lens element 440, a fifth lens element 450, an IR-cut filter 470 and an image plane 460, wherein the image capturing lens assembly has a total of five lens elements (410-450) with refractive power.

The first lens element 410 with positive refractive power has a convex object-side surface 411 and a concave image-side surface 412, and is made of glass. The object-side surface 411 and the image-side surface 412 of the first lens element 410 are aspheric. Furthermore, both of the object-side surface 411 and the image-side surface 412 of the first lens element 410 have at least one inflection point.

The second lens element 420 with negative refractive power has a concave object-side surface 421 and a convex image-side surface 422, and is made of plastic material. The object-side surface 421 and the image-side surface 422 of the second lens element 420 are aspheric. Furthermore, both of the object-side surface 421 and the image-side surface 422 of the second lens element 420 have at least one inflection point.

The third lens element 430 with negative refractive power has a concave object-side surface 431 and a convex image-side surface 432, and is made of plastic material. The object-side surface 431 and the image-side surface 432 of the third lens element 430 are aspheric. Furthermore, the image-side surface 432 of the third lens element 430 has at least one inflection point.

The fourth lens element 440 with negative refractive power has a concave object-side surface 441 and a convex image-side surface 442, and is made of plastic material. The object-side surface 441 and the image-side surface 442 of the fourth lens element 440 are aspheric. Furthermore, both of the object-side surface 441 and the image-side surface 442 of the fourth lens element 440 have at least one inflection point.

The fifth lens element 450 with positive refractive power has a concave object-side surface 451 and a convex image-side surface 452, and is made of plastic material. The object-side surface 451 and the image-side surface 452 of the fifth lens element 450 are aspheric. Furthermore, the object-side surface 451 of the fifth lens element 450 has at least one inflection point.

Each of the first through fifth lens elements (410-450) is a single and non-cemented lens element with refractive power. The IR-cut filter 470 is made of glass and located between the fifth lens element 450 and the image plane 460, and will not affect the focal length of the image capturing lens assembly.

The detailed optical data of the 4th embodiment are shown in Table 7 and the aspheric surface data are shown in Table 8 below.

TABLE 7

4th Embodiment
f = 3.51 mm, Fno = 2.80, HFOV = 30.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.019 | ASP | 0.641 | Glass | 1.603 | 60.6 | 2.02 |
| 2 | | 4.720 | ASP | 0.062 | | | | |
| 3 | Ape. Stop | Plano | | 0.059 | | | | |
| 4 | Lens 2 | −2.251 | ASP | 0.265 | Plastic | 1.640 | 23.3 | −9.37 |
| 5 | | −3.771 | ASP | 0.300 | | | | |
| 6 | Lens 3 | −4.293 | ASP | 0.330 | Plastic | 1.640 | 23.3 | −23.05 |
| 7 | | −6.237 | ASP | 0.121 | | | | |
| 8 | Lens 4 | −1.028 | ASP | 0.270 | Plastic | 1.544 | 55.9 | −6.00 |
| 9 | | −1.640 | ASP | 0.050 | | | | |
| 10 | Lens 5 | −16.154 | ASP | 0.845 | Plastic | 1.544 | 55.9 | 30.66 |
| 11 | | −8.358 | ASP | 0.300 | | | | |
| 12 | IR-cut filter | Plano | | 0.200 | Glass | 1.517 | 64.2 | — |
| 13 | | Plano | | 0.411 | | | | |
| 14 | Image | Plano | | — | | | | |

Note:
Reference wavelength (d-line) is 587.6 nm.

TABLE 8

Aspheric Coefficients

| | Surface # | | | | |
|---|---|---|---|---|---|
| | 1 | 2 | 4 | 5 | 6 |
| k = | −3.3928E+00 | −6.4806E+00 | −1.0000E+00 | −1.0000E+00 | −1.8010E+01 |
| A4 = | 3.6950E−01 | −1.1905E−01 | 2.5522E−01 | 5.0260E−01 | −2.8108E−01 |
| A6 = | −2.1191E−01 | −1.6898E−01 | 2.3619E−02 | 2.4774E−01 | −7.0185E−02 |
| A8 = | 2.0713E−01 | −2.2297E−01 | 2.7993E−01 | 5.8336E−01 | −2.3701E+00 |
| A10 = | −3.4094E−01 | 2.1110E−01 | −4.0495E−01 | −1.8386E−01 | 6.2087E+00 |
| A12 = | 4.8315E−01 | 1.3865E+00 | −3.8337E+00 | 6.9581E+00 | −1.0927E+01 |
| A14 = | −8.2500E−01 | −2.3392E+00 | 1.4302E+01 | −2.9946E+00 | |

| | Surface # | | | | |
|---|---|---|---|---|---|
| | 7 | 8 | 9 | 10 | 11 |
| k = | 4.0025E+01 | −4.1978E−01 | −6.6458E+00 | −1.0000E+00 | −1.0000E+00 |
| A4 = | −1.1334E−01 | 2.5637E−01 | −5.9628E−03 | −8.3416E−02 | −4.1169E−02 |
| A6 = | −7.9578E−02 | 1.5300E−01 | 1.5364E−01 | 1.2850E−02 | −1.7045E−02 |
| A8 = | −1.1517E−02 | −2.2703E−01 | −1.2509E−01 | 2.1824E−02 | 5.4576E−03 |
| A10 = | −7.4028E−02 | 2.9609E−01 | 5.9053E−02 | −6.7556E−04 | 2.9960E−05 |
| A12 = | 1.0039E−01 | −1.6234E−01 | −2.1543E−02 | −1.6154E−03 | −7.6580E−04 |
| A14 = | 8.9569E−02 | 2.7045E−02 | 4.5222E−03 | −5.7964E−04 | 1.6661E−04 |

In the image capturing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| 4th Embodiment | | | |
|---|---|---|---|
| f [mm] | 3.51 | |f/R9| + |f/R10| | 0.64 |
| Fno | 2.80 | f/f4 | −0.59 |
| HFOV [deg.] | 30.4 | f/f5 | 0.11 |
| (V2 + V4)/V5 | 1.42 | f4/f5 | −0.20 |
| CT4/CT5 | 0.32 | SD11/SD52 | 0.51 |
| T45/T34 | 0.41 | Sd/Td | 0.76 |
| R7/f | −0.29 | BL/Td | 0.31 |
| (R7 − R8)/(R7 + R8) | −0.23 | TL/f | 1.10 |
| |R8/R9| | 0.10 | | |

5th Embodiment

Figure 9:
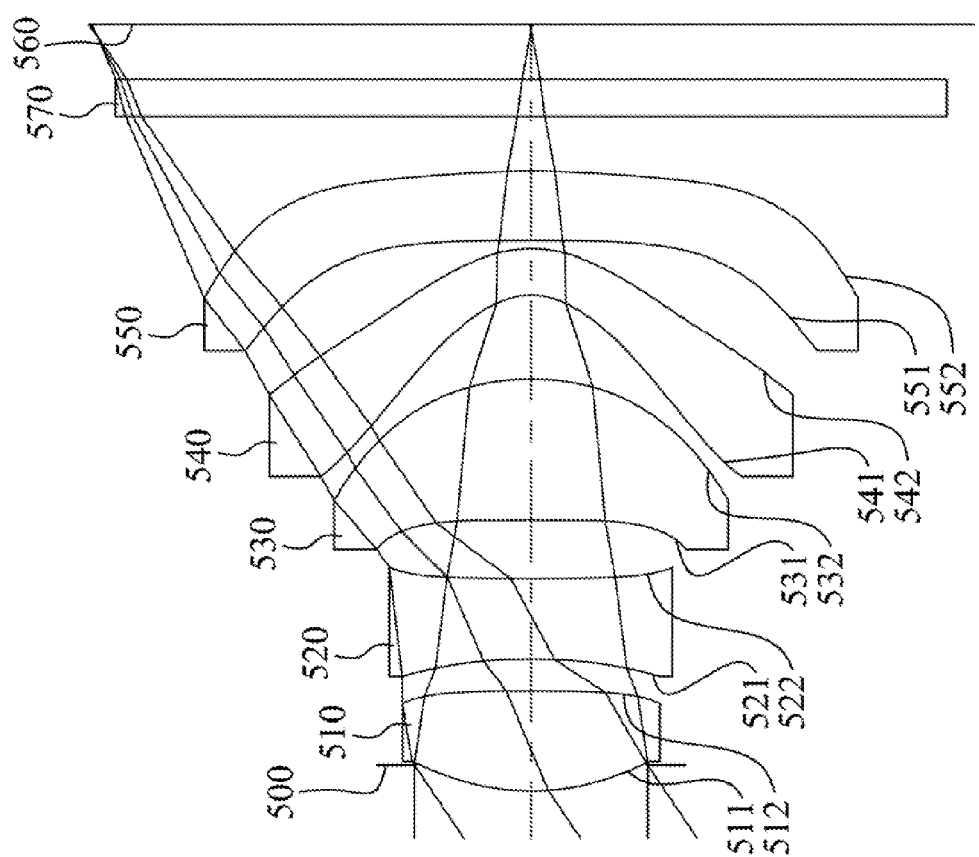
FIG. 9 is a schematic view of an image capturing lens assembly according to the 5th embodiment of the present disclosure.
Figure 10:
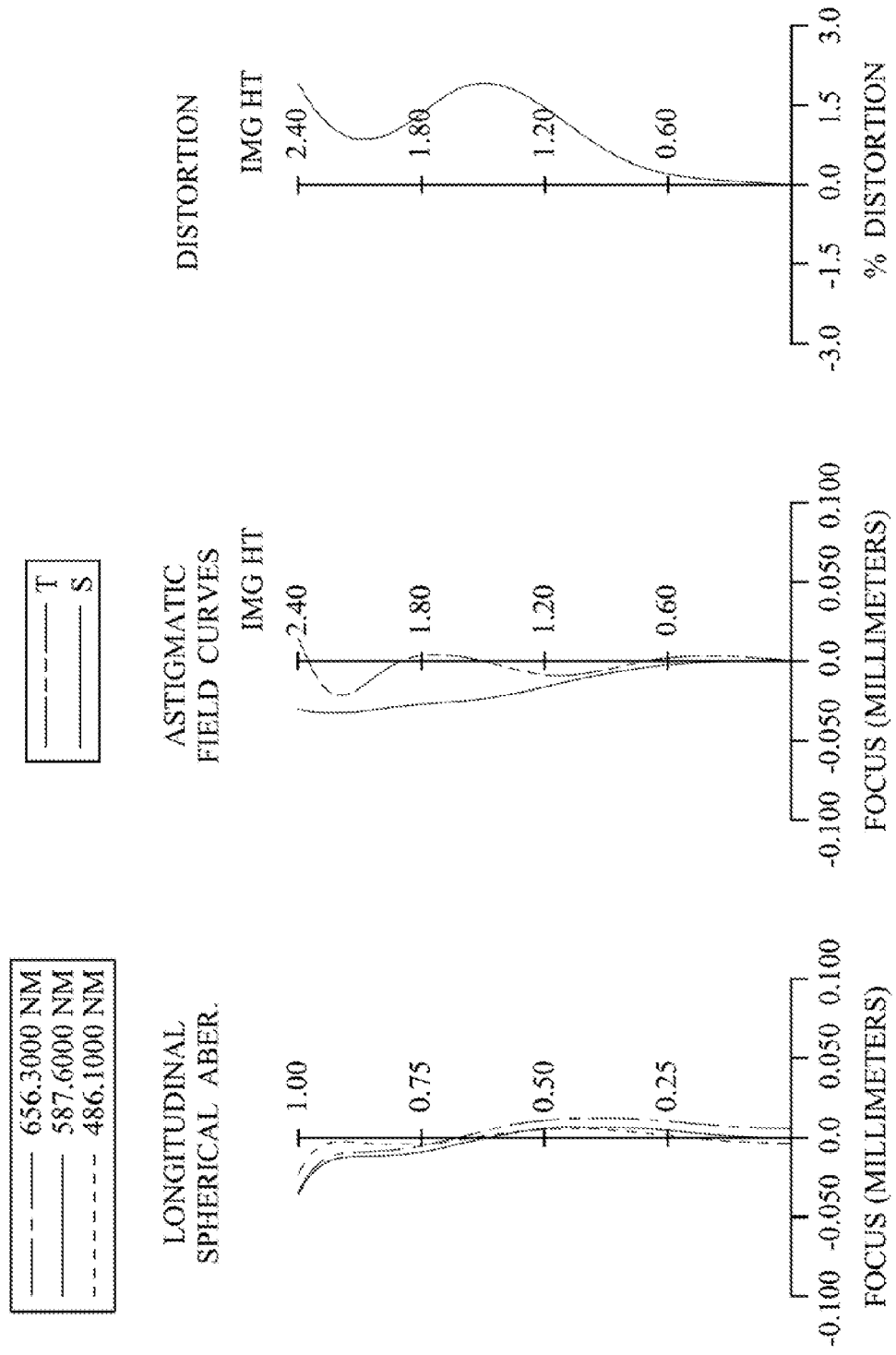
FIG. 10 shows spherical aberration curves, astigmatic field curves and a distortion curve of the image capturing lens assembly according to the 5th embodiment.

FIG. 9 is a schematic view of an image capturing lens assembly according to the 5th embodiment of the present disclosure. FIG. 10 shows spherical aberration curves, astigmatic field curves and a distortion curve of the image capturing lens assembly according to the 5th embodiment. In FIG. 9, the image capturing lens assembly includes, in order from an object side to an image side, an aperture stop 500, a first lens element 510, a second lens element 520, a third lens element 530, a fourth lens element 540, a fifth lens element 550, an IR-cut filter 570 and an image plane 560, wherein the image capturing lens assembly has a total of five lens elements (510-550) with refractive power.

The first lens element 510 with positive refractive power has a convex object-side surface 511 and a convex object-side surface 512, and is made of plastic material. The object-side surface 511 and the object-side surface 512 of the first lens element 510 are aspheric. Furthermore, the object-side surface 511 of the first lens element 510 has at least one inflection point.

The second lens element 520 with negative refractive power has a concave object-side surface 521 and a concave image-side surface 522, and is made of plastic material. The object-side surface 521 and the image-side surface 522 of the second lens element 520 are aspheric. Furthermore, the object-side surface 521 of the second lens element 520 has at least one inflection point.

The third lens element 530 with positive refractive power has a concave object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric. Furthermore, both of the object-side surface 541 and the image-side surface 542 of the fourth lens element 540 have at least one inflection point.

The fifth lens element 550 with positive refractive power has a concave object-side surface 551 and a convex image-side surface 552, and is made of plastic material. The object-side surface 551 and the image-side surface 552 of the fifth lens element 550 are aspheric.

Each of the first through fifth lens elements (510-550) is a single and non-cemented lens element with refractive power. The IR-cut filter 570 is made of glass and located between the fifth lens element 550 and the image plane 560, and will not affect the focal length of the image capturing lens assembly.

The detailed optical data of the 5th embodiment are shown in Table 9 and the aspheric surface data are shown in Table 10 below.

TABLE 9

5th Embodiment
f = 3.49 mm, Fno = 2.75, HFOV = 34.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.140 | | | | |
| 2 | Lens 1 | 1.305 | ASP | 0.541 | Plastic | 1.544 | 55.9 | 2.25 |
| 3 | | −17.361 | ASP | 0.177 | | | | |
| 4 | Lens 2 | −3.010 | ASP | 0.435 | Plastic | 1.650 | 21.4 | −3.99 |
| 5 | | 19.724 | ASP | 0.322 | | | | |
| 6 | Lens 3 | −37.222 | ASP | 0.768 | Plastic | 1.544 | 55.9 | 2.49 |
| 7 | | −1.317 | ASP | 0.457 | | | | |
| 8 | Lens 4 | −0.395 | ASP | 0.250 | Plastic | 1.544 | 55.9 | −2.37 |
| 9 | | −0.696 | ASP | 0.045 | | | | |
| 10 | Lens 5 | −18.400 | ASP | 0.380 | Plastic | 1.544 | 55.9 | 11.11 |
| 11 | | −4.582 | ASP | 0.300 | | | | |
| 12 | IR-cut filter | Plano | | 0.200 | Glass | 1.517 | 64.2 | — |
| 13 | | Plano | | 0.300 | | | | |
| 14 | Image | Plano | | — | | | | |

Note:
Reference wavelength (d-line) is 587.6 nm.

TABLE 10

Aspheric Coefficients

| | Surface # | | | | |
|---|---|---|---|---|---|
| | 2 | 3 | 4 | 5 | 6 |
| k = | −8.2923E−02 | 0.0000E+00 | −1.0000E+00 | −1.0000E+00 | −1.3815E+00 |
| A4 = | −2.0483E−02 | −1.0089E−01 | −5.8543E−02 | 3.4329E−02 | −1.4689E−01 |
| A6 = | −1.3921E−02 | −2.1094E−01 | −1.0198E−02 | 1.7311E−01 | −5.9679E−02 |
| A8 = | −6.4883E−02 | 5.0853E−02 | −1.0093E−01 | −2.6439E−01 | −2.5169E−01 |
| A10 = | −2.6477E−01 | −2.3386E−01 | 2.7512E−01 | 3.7295E−01 | 2.9370E−01 |
| A12 = | −1.0428E−01 | 1.1380E−02 | 3.0391E−02 | 9.6936E−02 | −1.2824E−01 |
| A14 = | | | | | −1.4277E−01 |
| A16 = | | | | | −2.8356E−01 |

| | Surface # | | | | |
|---|---|---|---|---|---|
| | 7 | 8 | 9 | 10 | 11 |
| k = | −6.7229E−02 | −1.1360E+00 | −1.2115E+00 | 0.0000E+00 | −8.5000E+01 |
| A4 = | −7.0354E−02 | 2.6405E−01 | 1.9681E−01 | −5.3221E−02 | 2.2736E−02 |
| A6 = | −1.0453E−01 | −5.6844E−02 | −6.9403E−03 | −2.8678E−02 | −3.1351E−02 |
| A8 = | 5.8268E−02 | −1.3166E−02 | −2.5547E−02 | 2.1402E−04 | 6.1737E−04 |
| A10 = | 5.8368E−02 | 1.2988E−02 | −2.9189E−03 | 2.2242E−03 | 5.9268E−04 |
| A12 = | −3.8463E−02 | 3.4133E−03 | 3.1107E−03 | −4.8446E−05 | −4.7831E−05 |
| A14 = | | | | | 5.9645E−06 |

In the image capturing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| 5th Embodiment | | | |
|---|---|---|---|
| f [mm] | 3.49 | \|f/R9\| + \|f/R10\| | 0.95 |
| Fno | 2.75 | f/f4 | −1.47 |
| HFOV [deg.] | 34.0 | f/f5 | 0.31 |
| (V2 + V4)/V5 | 1.38 | f4/f5 | −0.21 |
| CT4/CT5 | 0.66 | SD11/SD52 | 0.36 |
| T45/T34 | 0.10 | Sd/Td | 0.96 |
| R7/f | −0.11 | BL/Td | 0.24 |
| (R7 − R8)/(R7 + R8) | −0.28 | TL/f | 1.20 |
| \|R8/R9\| | 0.04 | | |

6th Embodiment

Figure 11:
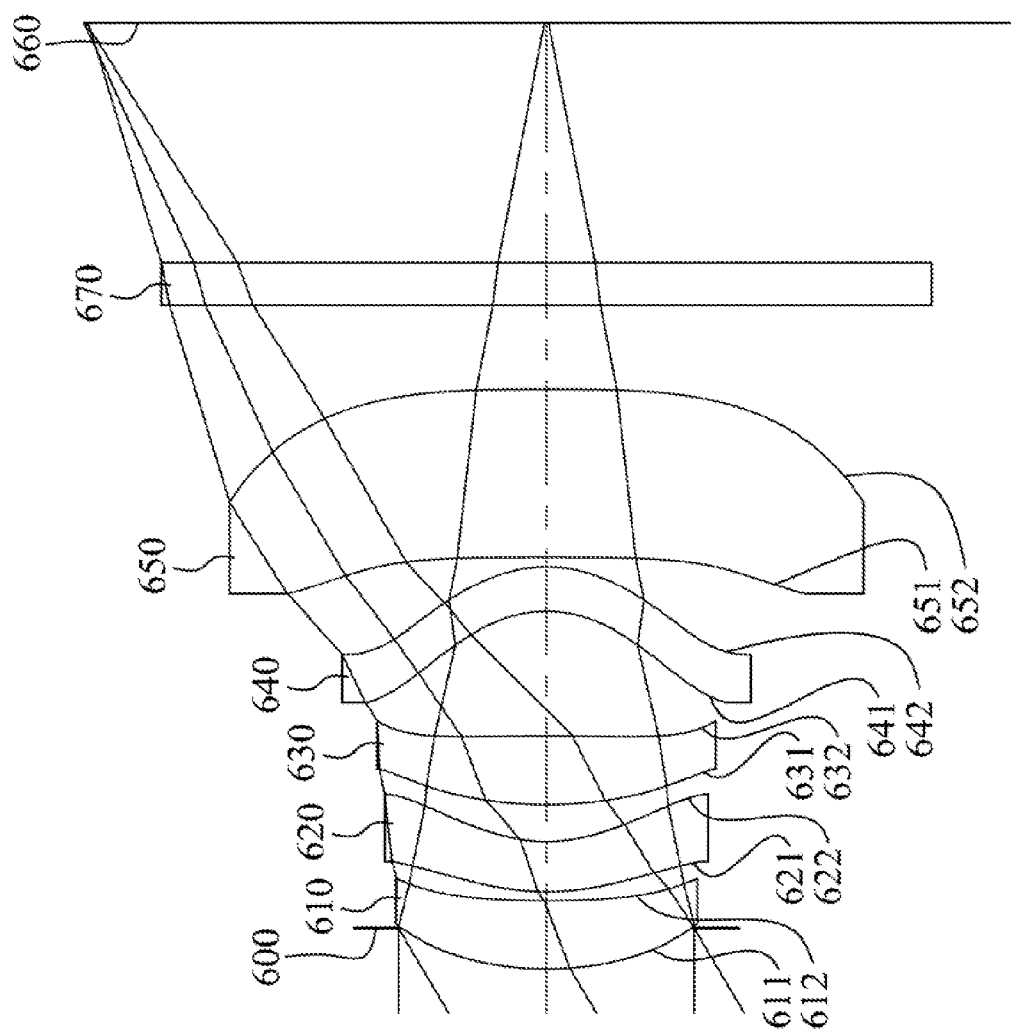
FIG. 11 is a schematic view of an image capturing lens assembly according to the 6th embodiment of the present disclosure.
Figure 12:
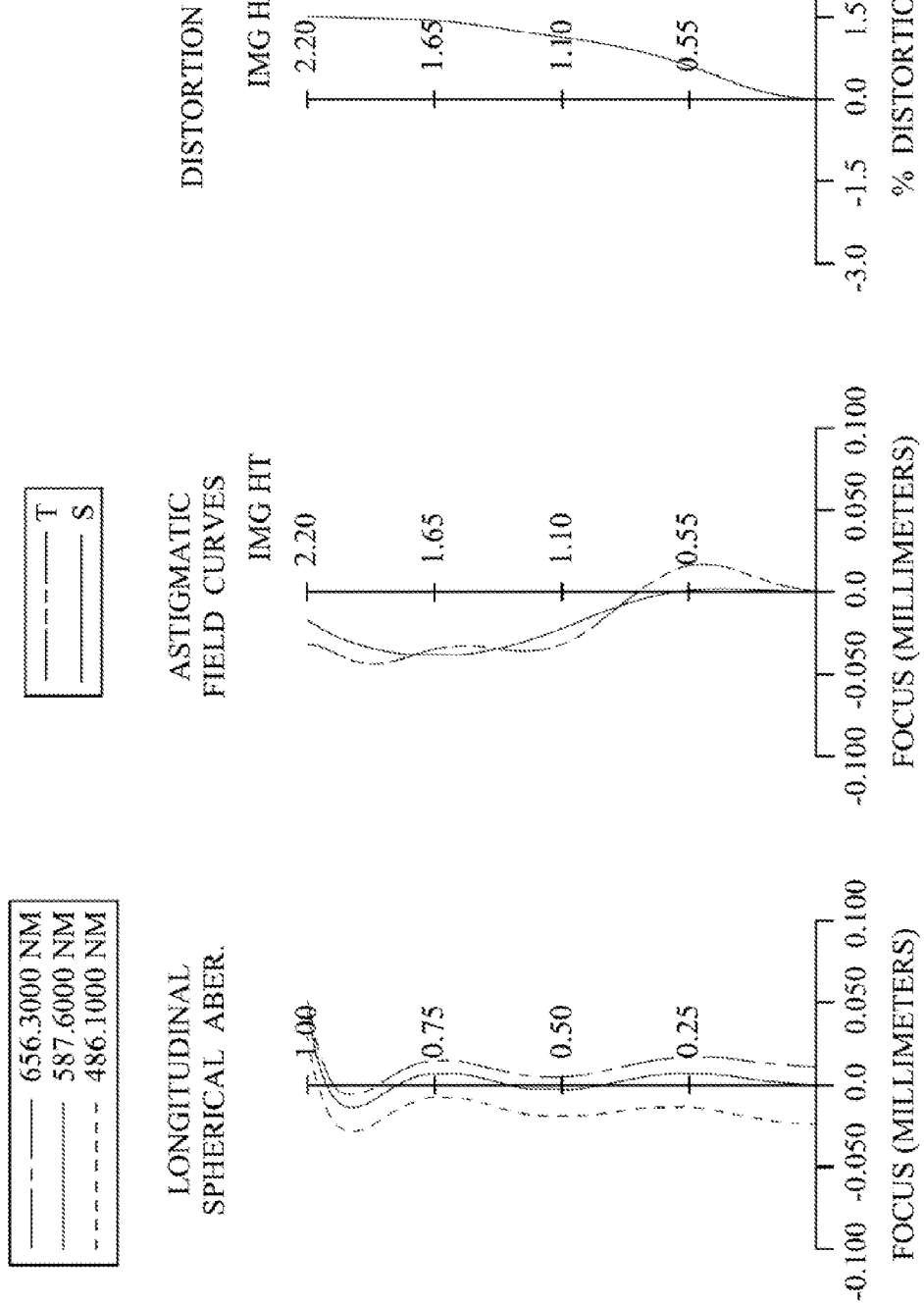
FIG. 12 shows spherical aberration curves, astigmatic field curves and a distortion curve of the image capturing lens assembly according to the 6th embodiment.

FIG. 11 is a schematic view of an image capturing lens assembly according to the 6th embodiment of the present disclosure. FIG. 12 shows spherical aberration curves, astigmatic field curves and a distortion curve of the image capturing lens assembly according to the 6th embodiment. In FIG. 11, the image capturing lens assembly includes, in order from an object side to an image side, an aperture stop 600, a first lens element 610, a second lens element 620, a third lens element 630, a fourth lens element 640, a fifth lens element 650, an IR-cut filter 670 and an image plane 660, wherein the image capturing lens assembly has a total of five lens elements (610-650) with refractive power.

The first lens element 610 with positive refractive power has a convex object-side surface 611 and a concave object-side surface 612, and is made of plastic material. The object-side surface 611 and the object-side surface 612 of the first lens element 610 are aspheric.

The second lens element 620 with negative refractive power has a convex object-side surface 621 and a concave image-side surface 622, and is made of plastic material. The object-side surface 621 and the image-side surface 622 of the second lens element 620 are aspheric. Furthermore, both of the object-side surface 621 and the image-side surface 622 of the second lens element 620 have at least one inflection point.

The third lens element 630 with positive refractive power has a convex object-side surface 631 and a convex image-side surface 632, and is made of plastic material. The object-side surface 631 and the image-side surface 632 of the third lens element 630 are aspheric. Furthermore, both of the object-side surface 631 and the image-side surface 632 of the third lens element 630 have at least one inflection point.

The fourth lens element 640 with positive refractive power has a concave object-side surface 641 and a convex image-side surface 642, and is made of plastic material. The object-side surface 641 and the image-side surface 642 of the fourth lens element 640 are aspheric. Furthermore, both of the object-side surface 641 and the image-side surface 642 of the fourth lens element 640 have at least one inflection point.

The fifth lens element 650 with positive refractive power has a concave object-side surface 651 and a convex image-side surface 652, and is made of plastic material. The object-side surface 651 and the image-side surface 652 of the fifth lens element 650 are aspheric. Furthermore, the object-side surface 651 of the fifth lens element 650 has at least one inflection point.

Each of the first through fifth lens elements (610-650) is a single and non-cemented lens element with refractive power. The IR-cut filter 670 is made of glass and located between the fifth lens element 650 and the image plane 660, and will, not affect the focal length of the image capturing lens assembly.

The detailed optical data of the 6th embodiment are shown in Table 1 and the aspheric surface data are shown in Table 12 below.

TABLE 11

6th Embodiment
f = 3.66 mm, Fno = 2.60, HFOV = 30.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.91 | | | | |
| 2 | Lens 1 | 1.553 | ASP | 0.322 | Plastic | 1.544 | 55.9 | 4.46 |
| 3 | | 3.987 | ASP | 0.045 | | | | |
| 4 | Lens 2 | 1.122 | ASP | 0.240 | Plastic | 1.640 | 23.3 | −4.81 |
| 5 | | 0.753 | ASP | 0.176 | | | | |
| 6 | Lens 3 | 2.071 | ASP | 0.323 | Plastic | 1.544 | 55.9 | 3.41 |
| 7 | | −16.705 | ASP | 0.594 | | | | |
| 8 | Lens 4 | −0.582 | ASP | 0.214 | Plastic | 1.640 | 23.3 | 50.34 |
| 9 | | −0.654 | ASP | 0.045 | | | | |
| 10 | Lens 5 | −45.141 | ASP | 0.800 | Plastic | 1.535 | 55.7 | 66.53 |
| 11 | | −20.024 | ASP | 0.400 | | | | |
| 12 | IR-cut filter | Plano | | 0.200 | Glass | 1.517 | 64.2 | — |
| 13 | | Plano | | 1.145 | | | | |
| 14 | Image | Plano | | — | | | | |

Note:
Reference wavelength (d-line) is 587.6 nm.

TABLE 12

Aspheric Coefficients

| Surface # | | | | |
|---|---|---|---|---|
| 2 | 3 | 4 | 5 | 6 |
| k = 6.4413E−01 | 2.8391E+00 | −6.9372E+00 | −2.7465E+00 | −3.7680E−01 |
| A4 = 9.4633E−02 | 1.8674E−03 | −7.6912E−02 | −1.5593E−01 | 4.7962E−02 |
| A6 = −4.2195E−02 | 6.1278E−01 | 2.0998E−01 | 3.9330E−01 | 1.2942E−01 |
| A8 = 5.1439E−02 | −8.0980E−01 | −4.3335E−01 | −1.0353E+00 | 1.9433E−02 |
| A10 = 3.1820E−01 | 3.1658E−01 | 7.9145E−02 | 5.1197E−01 | −3.0705E−01 |
| A12 = −1.5902E−01 | 1.8264E−01 | −1.5520E−02 | −3.5264E−02 | −3.9440E−01 |
| A14 = −1.4613E−01 | 2.9087E−01 | 3.1086E−02 | −1.1087E−01 | 4.0173E−01 |
| A16 = | | | | −7.6075E−02 |

| Surface # | | | | |
|---|---|---|---|---|
| 7 | 8 | 9 | 10 | 11 |
| k = −2.0581E+01 | −8.9317E−01 | −8.4628E−01 | −1.0000E+00 | −1.0000E+00 |
| A4 = 5.1526E−02 | 4.8478E−02 | 1.0780E−01 | −8.2138E−02 | −1.1592E−01 |
| A6 = 1.8102E−01 | 5.1511E−01 | 2.1666E−01 | −1.1729E−01 | 4.7214E−02 |
| A8 = 1.2847E−01 | 3.6857E−01 | 2.2297E−01 | −1.6307E−02 | −2.6052E−02 |
| A10 = −1.6603E−01 | −4.7934E−01 | 1.0603E−01 | 1.0255E−02 | 3.9045E−03 |
| A12 = 2.6911E−01 | 1.9676E−02 | −1.0014E−01 | 1.0563E−02 | 8.3109E−04 |
| A14 = −1.9841E−02 | 2.1918E−02 | −1.9475E−01 | 3.1423E−03 | −3.0603E−04 |
| A16 = | −7.0980E−03 | 7.0503E−02 | −3.9784E−03 | |

In the image capturing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| 6th Embodiment | | | |
|---|---|---|---|
| f [mm] | 3.66 | |f/R9| + |f/R10| | 0.26 |
| Fno | 2.60 | f/f4 | 0.07 |
| HFOV [deg.] | 30.7 | f/f5 | 0.05 |
| (V2 + V4)/V5 | 0.84 | f4/f5 | 0.76 |
| CT4/CT5 | 0.27 | SD11/SD52 | 0.48 |
| T45/T34 | 0.08 | Sd/Td | 0.93 |
| R7/f | −0.16 | BL/Td | 0.63 |
| (R7 − R8)/(R7 + R8) | −0.06 | TL/f | 1.23 |
| |R8/R9| | 0.01 | | |

7th Embodiment

Figure 13:
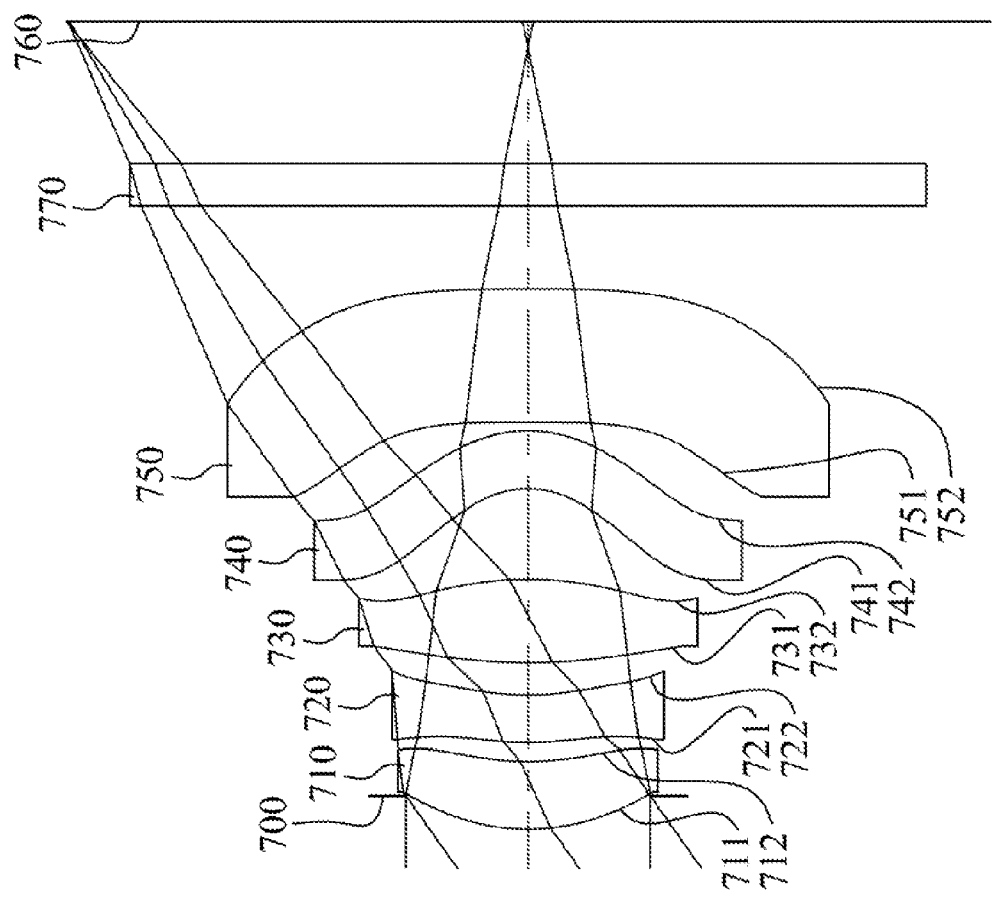
FIG. 13 is a schematic view of an image capturing lens assembly according to the 7th embodiment of the present disclosure.
Figure 14:
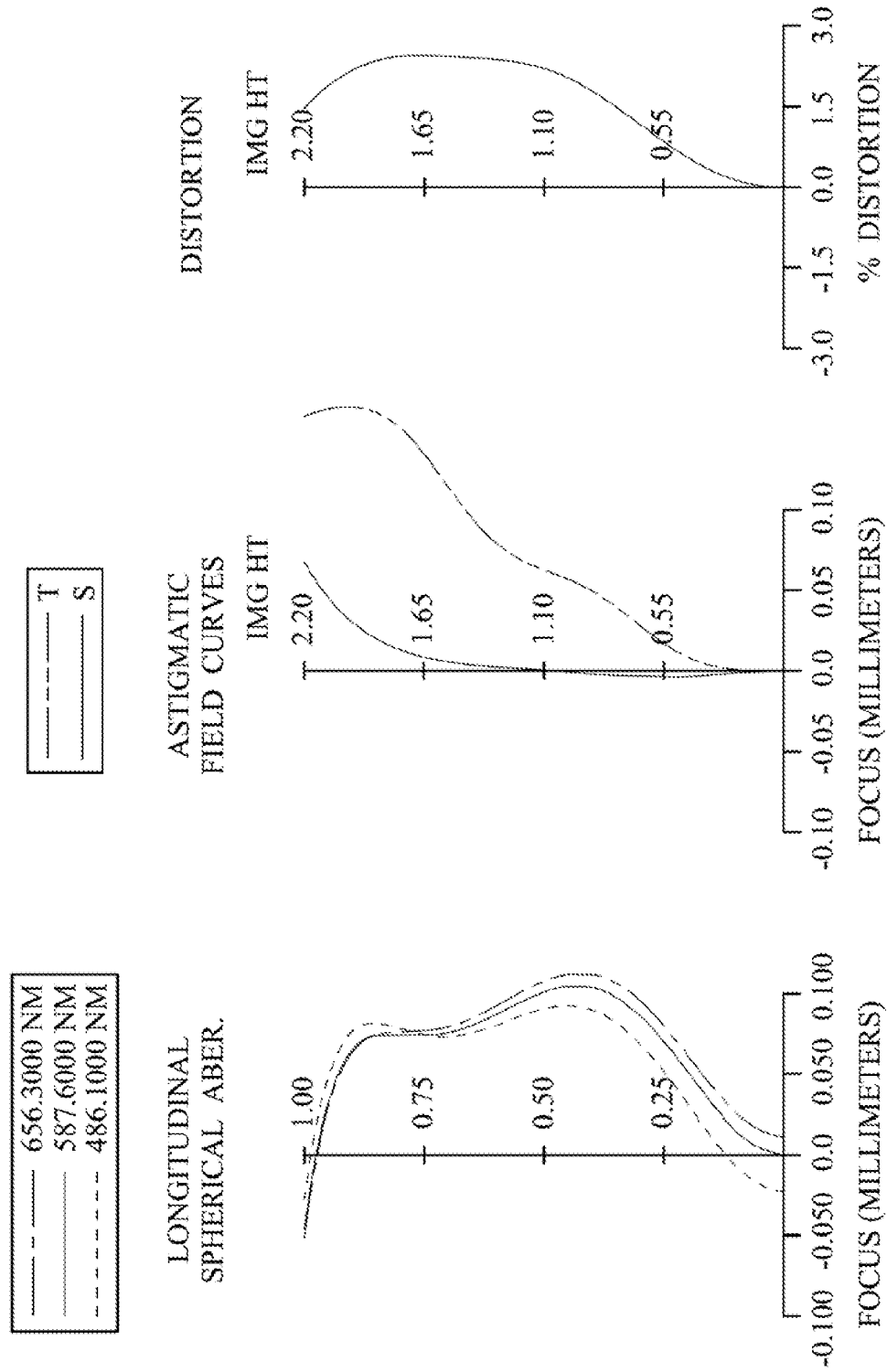
FIG. 14 shows spherical aberration curves, astigmatic field curves and a distortion curve of the image capturing lens assembly according to the 7th embodiment.

FIG. 13 is a schematic view of an image capturing lens assembly according to the 7th embodiment of the present disclosure. FIG. 14 shows spherical aberration curves, astigmatic field curves and a distortion curve of the image capturing lens assembly according to the 7th embodiment. In FIG. 13, the image capturing lens assembly includes, in order from an object side to an image side, an aperture stop 700, a first lens element 710, a second lens element 720, a third lens element 730, a fourth lens element 740, a fifth lens element 750, an IR-cut filter 770 and an image plane 760, wherein the image capturing lens assembly has a total of five lens elements (710-750) with refractive power.

The first lens element 710 with positive refractive power has a convex object-side surface 711 and a concave image-side surface 712, and is made of plastic material. The object-side surface 711 and the image-side surface 712 of the first lens element 710 are aspheric. Furthermore, the image-side surface 712 of the first lens element 710 has at least one inflection point.

The second lens element 720 with negative refractive power has a convex object-side surface 721 and a concave image-side surface 722, and is made of plastic material. The object-side surface 721 and the image-side surface 722 of the second lens element 720 are aspheric. Furthermore, the object-side surface 721 of the second lens element 720 has at least one inflection point.

The third lens element 730 with positive refractive power has a convex object-side surface 731 and a convex image-side surface 732, and is made of plastic material. The object-side surface 731 and the image-side surface 732 of the third lens element 730 are aspheric. Furthermore, the image-side surface 732 of the third lens element 730 has at least one inflection point.

The fourth lens element 740 with negative refractive power has a concave object-side surface 741 and a convex image-side surface 742, and is made of plastic material. The object-side surface 741 and the image-side surface 742 of the fourth lens element 740 are aspheric. Furthermore, both of the object-side surface 741 and the image-side surface 742 of the fourth lens element 740 have at least one inflection point.

The fifth lens element 750 with positive refractive power has a concave object-side surface 751 and a convex image-side surface 752, and is made of plastic material. The object-side surface 751 and the image-side surface 752 of the fifth lens element 750 are aspheric. Furthermore, the object-side surface 751 of the fifth lens element 750 has at least one inflection point.

Each of the first through fifth lens elements (710-750) is a single and non-cemented lens element with refractive power. The IR-cut filter 770 is made of glass and located between the fifth lens element 750 and the image plane 760, and will not affect the focal length of the image capturing lens assembly.

The detailed optical data of the 7th embodiment are shown in Table 13 and the aspheric surface data are shown in Table 14 below.

TABLE 13

7th Embodiment
f = 2.99 mm, Fno = 2.55, HFOV = 35.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.159 | | | | |
| 2 | Lens 1 | 1.024 | ASP | 0.324 | Plastic | 1.535 | 55.7 | 7.45 |
| 3 | | 1.226 | ASP | 0.090 | | | | |
| 4 | Lens 2 | 1.407 | ASP | 0.230 | Plastic | 1.639 | 23.5 | −20.67 |
| 5 | | 1.191 | ASP | 0.155 | | | | |
| 6 | Lens 3 | 2.406 | ASP | 0.400 | Plastic | 1.544 | 55.9 | 1.85 |
| 7 | | −1.632 | ASP | 0.433 | | | | |
| 8 | Lens 4 | −0.438 | ASP | 0.282 | Plastic | 1.650 | 21.4 | −4.75 |
| 9 | | −0.640 | ASP | 0.040 | | | | |
| 10 | Lens 5 | −45.141 | ASP | 0.640 | Plastic | 1.535 | 55.7 | 33.72 |
| 11 | | −12.953 | ASP | 0.400 | | | | |
| 12 | IR-cut filter | Plano | | 0.200 | Glass | 1.517 | 64.2 | — |
| 13 | | Plano | | 0.684 | | | | |
| 14 | Image | Plano | | — | | | | |

Note:
Reference wavelength (d-line) is 587.6 nm.

TABLE 14

Aspheric Coefficients

| | Surface # | | | | |
|---|---|---|---|---|---|
| | 2 | 3 | 4 | 5 | 6 |
| k = | 2.5310E−01 | −1.3596E+01 | −2.8835E+01 | −1.0200E+01 | −2.3176E+01 |
| A4 = | −1.9401E−01 | −7.2363E−02 | −4.3802E−01 | −4.1334E−01 | −6.7826E−02 |
| A6 = | 7.7535E−01 | −1.4195E−01 | −6.0084E−01 | 7.1467E−01 | 2.6950E−01 |
| A8 = | −2.5612E+00 | −2.6614E+00 | 2.6349E−01 | −4.1575E−01 | −1.6071E−01 |
| A10 = | 1.7698E+00 | 4.3446E+00 | 5.7380E+00 | 2.3259E+00 | −2.8122E−01 |
| A12 = | 1.2873E+00 | −2.9004E+00 | −3.1238E+00 | 2.4100E−01 | −8.7331E−01 |
| A14 = | −3.5048E+00 | 2.4354E+00 | −5.5138E+00 | −2.1490E+00 | 1.9303E+00 |
| A16 = | | | | | −3.6650E−01 |

| | Surface # | | | | |
|---|---|---|---|---|---|
| | 7 | 8 | 9 | 10 | 11 |
| k = | −1.3700E+00 | −1.1513E+00 | −8.5005E−01 | 3.0000E+00 | 7.6924E−01 |
| A4 = | −4.2838E−02 | 1.5110E−01 | 8.0166E−02 | −3.8546E−01 | −9.2037E−02 |
| A6 = | 2.5153E−01 | 7.7918E−01 | 3.2513E−01 | 2.3352E−03 | −5.9684E−02 |
| A8 = | 4.6201E−01 | 2.6969E−01 | 2.0782E−01 | 3.4495E−02 | 4.7456E−02 |
| A10 = | −5.9994E−03 | −7.1207E−01 | 6.4463E−02 | 5.5545E−02 | −6.2027E−03 |
| A12 = | 3.6911E−02 | −8.2421E−02 | −1.6290E−01 | 2.9183E−02 | −4.5168E−03 |
| A14 = | −6.8997E−01 | 1.1215E−02 | −2.4604E−01 | −1.1927E−04 | 1.1058E−03 |
| A16 = | | 5.7761E−02 | 1.6901E−01 | −1.8699E−02 | |

In the image capturing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| 7th Embodiment | | | |
|---|---|---|---|
| f [mm] | 2.99 | |f/R9| + |f/R10| | 0.30 |
| Fno | 2.55 | f/f4 | −0.63 |
| HFOV [deg.] | 35.4 | f/f5 | 0.09 |
| (V2 + V4)/V5 | 0.81 | f4/f5 | −0.14 |
| CT4/CT5 | 0.44 | SD11/SD52 | 0.42 |
| T45/T34 | 0.09 | Sd/Td | 0.94 |
| R7/f | −0.15 | BL/Td | 0.49 |

-continued

| 7th Embodiment | | | |
|---|---|---|---|
| (R7 − R8)/(R7 + R8) | −0.19 | TL/f | 1.30 |
| |R8/R9| | 0.01 | | |

It is to be noted that TABLES 1-14 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:
1. An image capturing lens assembly comprising, in order from an object side to an image side:

a first lens element with positive refractive power having a convex object-side surface;
second lens element having negative refractive power;
a third lens element having refractive power;
a fourth lens element having refractive power, wherein both of an object-side surface and an image-side surface of the fourth lens element are aspheric; and
a fifth lens element with positive refractive power having a concave object-side surface and a convex image-side surface, wherein both of the object-side surface and the image-side surface of the fifth lens element are aspheric;
wherein each of the first through fifth lens elements with refractive power is single and non-cemented, the image capturing lens assembly has a total of five lens elements with refractive power and further comprises a stop, an axial distance between the third lens element and the fourth lens element is T34, an axial distance between the fourth lens element and the fifth lens element is T45, an axial distance between the stop and the image-side surface of the fifth lens element is Sd, an axial distance between the object-side surface of the first lens element and the image-side surface of the fifth lens element is Td, an axial distance between the image-side surface of the fifth lens element and an image plane is BL, and the following relationships are satisfied:

$0 < T45/T34 < 0.8;$ $0.7 < Sd/Td < 1.2;$ and $0.1 < BL/Td < 0.7.$

2. The image capturing lens assembly of claim 1, wherein a curvature radius of the image-side surface of the fourth lens element is R8, a curvature radius of the object-side surface of the fifth lens element is R9, and the following relationship is satisfied:

$|R8/R9| < 0.80.$

3. The image capturing lens assembly of claim 2, wherein the object-side surface of the fourth lens element is concave and the image-side surface of the fourth lens element is convex.

4. The image capturing lens assembly of claim 3, wherein the third lens element has positive refractive power.

5. The image capturing lens assembly of claim 3, wherein a focal length of the image capturing lens assembly is f, a focal length of the fifth lens element is f5, and the following relationship is satisfied:

$0 < f/f5 < 0.8.$

6. The image capturing lens assembly of claim 3, wherein the fourth lens element has negative refractive power.

7. The image capturing lens assembly of claim 3, wherein a vertical distance between a maximum effective diameter position on the object-side surface of the first lens element and an optical axis is SD11, a vertical distance between a maximum effective diameter position on the image-side surface of the fifth lens element and the optical axis is SD52, and the following relationship is satisfied:

$0.2 < SD11/SD52 < 0.6.$

8. The image capturing lens assembly of claim 3, wherein at least one inflection point is formed on at least one of the object-side surface and the image side surface of at least one of the first through fifth lens elements.

9. The image capturing lens assembly of claim 3, wherein a curvature radius of the object-side surface of the fourth lens element is R7, a focal length of the image capturing lens assembly is f, and the following relationship is satisfied:

$-0.35 < R7/f < 0.$

10. The image capturing lens assembly of claim 2, wherein a focal length of the image capturing lens assembly is f, a focal length of the fourth lens element is f4, and the following relationship is satisfied:

$-2.0 < f/f4 < 1.5.$

11. The image capturing lens assembly of claim 10, wherein the focal length of the image capturing lens assembly is f, the focal length of the fourth lens element is f4, and the following relationship is satisfied:

$-1.5 < f/f4 < 0.3.$

12. The image capturing lens assembly of claim 10, wherein a central thickness of the fourth lens element is CT4, a central thickness of the fifth lens element is CT5, and the following relationship is satisfied:

$0.1 < CT4/CT5 < 0.5.$

13. The image capturing lens assembly of claim 10, wherein the axial distance between the third lens element and the fourth lens element is T34, the axial distance between the fourth lens element and the fifth lens element is T45, and the following relationship is satisfied:

$0.02 < T45/T34 < 0.5.$

14. The image capturing lens assembly of claim 1, wherein an axial distance between the object-side surface of the first lens element and the image plane is TL, a focal length of the image capturing lens assembly is f, and the following relationship is satisfied:

$0.7 < TL/f < 1.4.$

15. The image capturing lens assembly of claim 14, wherein the focal length of the image capturing lens assembly is f, a curvature radius of the object-side surface of the fifth lens element is R9, a curvature radius of the image-side surface of the fifth lens element is R10, and the following relationship is satisfied:

$|f/R9| + |f/R10| < 1,5.$

16. The image capturing lens assembly of claim 1, wherein an Abbe number of the second lens element is V2, an Abbe number of the fourth lens element is V4, an Abbe number of the fifth lens element is V5, and the following relationship is satisfied:

$0.5 < (V2+V4)/V5 < 1.0.$

17. An image capturing lens assembly comprising, in order from an object side to an image side:
a first lens element with positive refractive power having a convex object-side surface;
a second lens element having negative refractive power;
a third lens element having refractive power;
a fourth lens element having refractive power, wherein both of an object-side surface and an image-side surface of the fourth lens element are aspheric; and
a fifth lens element with positive refractive power having a concave object-side surface and a convex image-side surface, wherein both of the object-side surface and the image-side surface of the fifth lens element are aspheric;
wherein each of the first through fifth lens elements with refractive power is single and non-cemented, the image capturing lens assembly has a total of five lens elements with refractive power and further comprises a stop, at least one inflection point is formed on at least one of the object-side surface and the image-side surface of at least one of the first through fifth lens elements, an axial distance between the third lens element and the fourth lens element is T34, an axial distance between the fourth lens element and the fifth lens element is T45, an axial distance between the stop and the image-side surface of the fifth lens element is Sd, an axial distance between the object-side surface of the first lens element and the image-side surface of the fifth lens element is Td, and the following relationships are satisfied:

$0 < T45/T34 < 1.2;$ and $0.7 < Sd/Td < 1.2.$

18. The image capturing lens assembly of claim 17, wherein the object-side surface of the fourth lens element is concave and the image-side surface of the fourth lens element is convex.

19. The image capturing lens assembly of claim 18, wherein a focal length of the fourth lens element is f4, a focal length of the fifth lens element is f5, and the following relationship is satisfied:

$-0.8 < f4/f5 < 0.8.$

20. The image capturing lens assembly of claim 18, wherein the third lens element has positive refractive power, a curvature radius of the image-side surface of the fourth lens element is R8, a curvature radius of the object-side surface of the fifth lens element is R9, and the following relationship is satisfied:

$|R8/R9| < 0.80.$

21. The image capturing lens assembly of claim 18, wherein the axial distance between the third lens element and the fourth lens element is T34, the axial distance between the fourth lens element and the fifth lens element is T45, and the following relationship is satisfied:

$0.02 < T45/T34 < 0.5.$

22. The image capturing lens assembly of claim 18, wherein a curvature radius of the object-side surface of the fourth lens element is R7, a curvature radius of the image-side surface of the fourth lens element is R8, and the following relationship is satisfied:

$-0.3 < (R7 - R8)/(R7 + R8) < 0.$

23. The image capturing lens assembly of claim 17, wherein a vertical distance between a maximum effective diameter position on the object-side surface of the first lens element and an optical axis is SD11, a vertical distance between a maximum effective diameter position on the image-side surface of the fifth lens element and the optical axis is SD52, and the following relationship is satisfied:

$0.2 < SD11/SD52 < 0.6.$

24. The image capturing lens assembly of claim 17, wherein a focal length of the image capturing lens assembly is f, a curvature radius of the object-side surface of the fifth lens element is R9, a curvature radius of the image-side surface of the fifth lens element is R10, and the following relationship is satisfied:

$|f/R9| + |f/R10| < 1.5.$

25. The image capturing lens assembly of claim 17, wherein an Abbe number of the second lens element is V2, an Abbe number of the fourth lens element is V4, an Abbe number of the fifth lens element is V5, and the following relationship is satisfied:

$0.5 < (V2 + V4)/V5 < 1.0.$

* * * * *

UNITED STATES PATENT AND TRADEMARK OFFICE
CERTIFICATE OF CORRECTION

PATENT NO. : 8,896,936 B2  
APPLICATION NO. : 13/861398  
DATED : November 25, 2014  
INVENTOR(S) : Tsung-Han Tsai and Hsin-Hsuan Huang It is certified that error appears in the above-identified patent and that said Letters Patent is hereby corrected as shown below:

In the Claims

In column 27, line 3, Claim 1 of the issued patent reads as "second lens element having negative refractive power", but it should read as "a second lens element having negative refractive power".
In column 28, line 43, Claim 15 of the issued patent reads as "|f/R9|+|f/R10| < 1,5", but it should read as "|f/R9|+|f/R10| < 1.5".
In column 29, line 31, Claim 20 of the issued patent reads as "R8/R9| < 0.80", but it should read as "|R8/R9| < 0.80".

Signed and Sealed this
Seventeenth Day of March, 2015

Michelle K. Lee
*Director of the United States Patent and Trademark Office*